US012292935B1

(12) United States Patent
Harper et al.

(10) Patent No.: US 12,292,935 B1
(45) Date of Patent: May 6, 2025

(54) PERSONAL LEGACY ACCOUNTING AND REMEMBRANCE

(71) Applicant: UIPCO, LLC, San Antonio, TX (US)

(72) Inventors: Thomas Mercer Harper, San Antonio, TX (US); Noe Alberto Martinez, San Antonio, TX (US); Keegan Patrick Hayes, Whitestown, IN (US); Jennifer Dawn Ayala, San Antonio, TX (US); Jennifer Marie Chandler-Bradley, Tampa, FL (US); Joseph H. Louwagie, III, San Antonio, TX (US); Mathew Cyriac Kottoor, San Antonio, TX (US); Emily Nicole Van Santen, Denver, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/055,670

(22) Filed: Nov. 15, 2022

(51) Int. Cl.
*G06F 16/00* (2019.01)
*G06F 16/904* (2019.01)
*G06F 16/908* (2019.01)

(52) U.S. Cl.
CPC .......... *G06F 16/908* (2019.01); *G06F 16/904* (2019.01)

(58) Field of Classification Search
CPC .............................. G06F 16/904; G06F 16/908
USPC ......................................................... 707/741
See application file for complete search history.

(56) References Cited

U.S. PATENT DOCUMENTS

| 7,315,826 | B1 * | 1/2008 | Guheen | G06Q 30/0201 705/7.29 |
| 8,468,143 | B1 * | 6/2013 | Oztekin | G06F 16/90335 707/706 |
| 11,113,893 | B1 * | 9/2021 | Ma | G06F 3/011 |
| 11,347,054 | B2 * | 5/2022 | Woods | G06T 19/006 |
| 11,635,929 | B2 * | 4/2023 | Green | G10L 25/63 52/134 |
| 11,636,655 | B2 * | 4/2023 | Ma | G06Q 50/01 345/633 |
| 11,663,675 | B1 * | 5/2023 | Estes | G06Q 20/401 705/4 |
| 11,704,398 | B1 * | 7/2023 | Tougas | H04L 51/02 726/9 |
| 12,039,018 | B2 * | 7/2024 | Cheng | G06F 21/31 |
| 2013/0262092 | A1 | 10/2013 | Wasick | |

(Continued)

OTHER PUBLICATIONS

Shirwan Jassim, Exploration of personal digital legacy through geo-tagged augmented reality and slow technology, 2017, Malmo Hogskola, pp. 1-72 (Year: 2017).*

*Primary Examiner* — Ann J Lo
*Assistant Examiner* — Rezwanul Mahmood
(74) *Attorney, Agent, or Firm* — Potomac Law Group, PLLC; Dannon G. Allbee

(57) ABSTRACT

Methods and systems described herein are directed to obtaining various types of information that can provide an accounting for an individual's legacy that can be replayed to learn about objects and/or experiences associated with the individual. A personal legacy accountant can generate a legacy profile using automatically obtained public records and personal records supplied by the individual, and afford the individual an opportunity to contextualize records for the profile. Through this contextualization, the individual can selectively define one or more perspectives for her legacy.

20 Claims, 24 Drawing Sheets

(56) References Cited

U.S. PATENT DOCUMENTS

| | | | |
|---|---|---|---|
| 2014/0164412 A1* | 6/2014 | Rosenberg | G06F 16/211 707/756 |
| 2014/0304596 A1* | 10/2014 | Chandran | G06Q 50/01 715/704 |
| 2014/0337930 A1* | 11/2014 | Hoyos | G06F 21/34 726/4 |
| 2014/0359439 A1* | 12/2014 | Lyren | G06F 16/9538 707/706 |
| 2016/0055672 A1* | 2/2016 | Lundin | A63F 13/212 340/870.07 |
| 2017/0140174 A1* | 5/2017 | Lacey | G06Q 20/4016 |
| 2017/0235965 A1* | 8/2017 | Balinsky | G06F 9/4843 726/1 |
| 2017/0346851 A1* | 11/2017 | Drake | H04L 9/0838 |
| 2017/0352083 A1* | 12/2017 | Ruck | G06Q 10/1093 |
| 2018/0025303 A1 | 1/2018 | Janz | |
| 2019/0068529 A1* | 2/2019 | Mullins | G06T 19/006 |
| 2019/0163985 A1* | 5/2019 | Wang | G06Q 30/00 |
| 2019/0311341 A1* | 10/2019 | Rice | G06F 3/011 |
| 2019/0327330 A1* | 10/2019 | Natarajan | G06N 3/08 |
| 2020/0042160 A1* | 2/2020 | Gabbi | G06F 3/04845 |
| 2020/0050739 A1* | 2/2020 | Wiacek | G06F 21/10 |
| 2020/0175086 A1* | 6/2020 | Pavlovskaia | G06F 40/10 |
| 2020/0210647 A1* | 7/2020 | Panuganty | G06N 3/08 |
| 2020/0320645 A1* | 10/2020 | Smith | G16B 50/00 |
| 2020/0334347 A1* | 10/2020 | Hoyos | H04L 63/0861 |
| 2021/0264520 A1* | 8/2021 | Cummings | G06Q 40/12 |
| 2021/0279695 A1* | 9/2021 | Rice | G06Q 20/12 |
| 2021/0312175 A1* | 10/2021 | McAndrew | H04W 12/71 |
| 2022/0157027 A1* | 5/2022 | Ma | G02B 27/0093 |
| 2022/0188845 A1 | 6/2022 | Eivy et al. | |
| 2022/0229817 A1* | 7/2022 | Niddam | G06F 9/45558 |
| 2022/0245159 A1 | 8/2022 | Vangala et al. | |
| 2023/0068734 A1* | 3/2023 | Sharda | A63F 13/5375 |
| 2023/0118782 A1* | 4/2023 | McCool | G06F 16/906 726/27 |
| 2023/0135050 A1* | 5/2023 | Sadik | G06Q 50/01 706/46 |
| 2023/0152947 A1* | 5/2023 | Eirinberg | H04L 67/12 715/734 |
| 2023/0215120 A1* | 7/2023 | Ma | G06F 3/013 345/633 |
| 2023/0291740 A1* | 9/2023 | Ashby | H04L 63/083 |
| 2023/0342100 A1* | 10/2023 | Wawruch | G06T 19/006 |
| 2023/0353616 A1* | 11/2023 | Andon | H04W 4/021 |

* cited by examiner

PERSONAL LEGACY ACCOUNTING AND REMEMBRANCE

CROSS-REFERENCE TO RELATED APPLICATIONS

This application is related to U.S. patent application Ser. No. 18/055,676, titled "PERSONAL LEGACY ACCOUNTING AND REMEMBRANCE," filed on Nov. 15, 2022, currently pending, which is herein incorporated by reference in its entirety.

TECHNICAL FIELD

The present disclosure is directed to coordinating computing systems to obtain, organize, and regenerate various information serving to define a profile for memorializing an individual's legacy.

BACKGROUND

All too often the passing of an individual can bring about a plethora of curiosities about that individual's personality, station in life, interests and experiences, likes and dislikes, etc. Many times, only static artifacts remain as the sole, available avenues for gleaning an understanding of an individual's life story, i.e., her personal legacy. For instance, such artifacts can take the form of pictures in a photo album, personal belongings, keepsakes, and other items of reflection that can be turned to in an attempt to resolve the aforementioned curiosities. Frequently, however, the "story" behind one or more of these items can be much lengthier than may first appear, and thus go untold in its entirety, when the items are unaccompanied by appropriate context.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
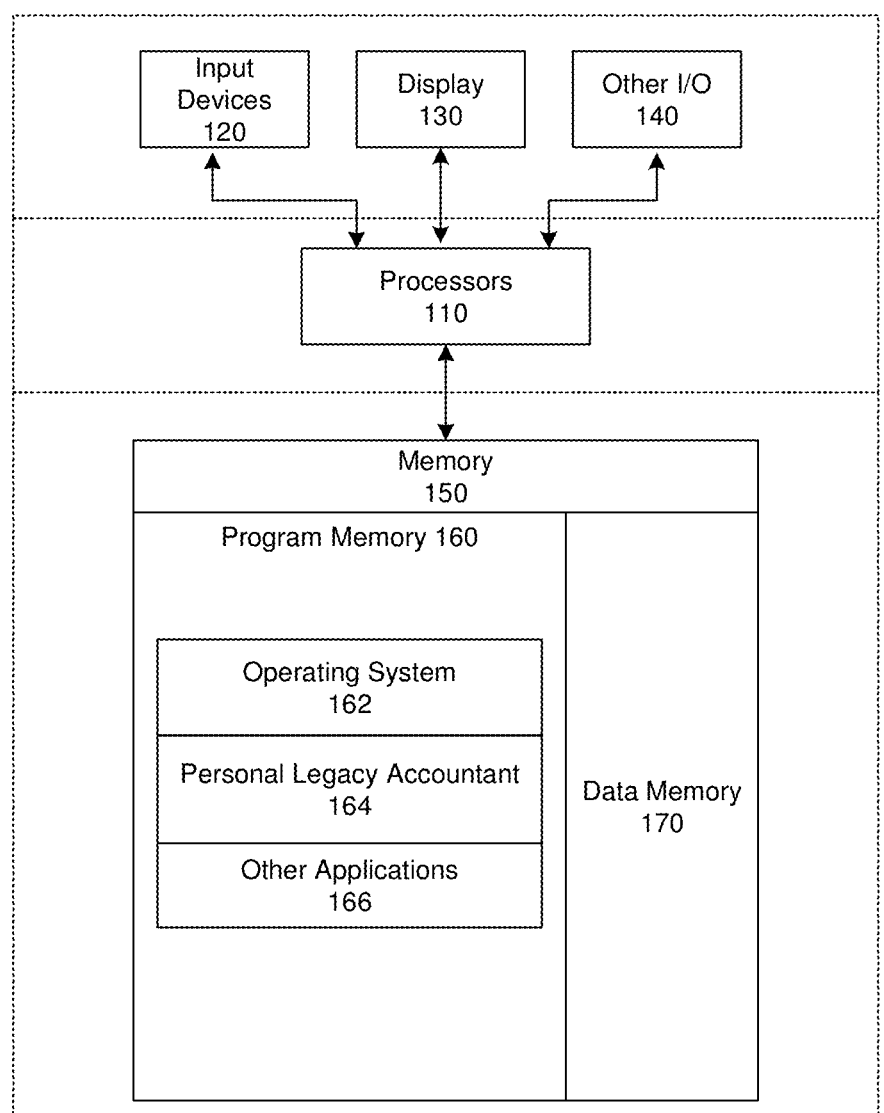
FIG. 1 is a block diagram illustrating an overview of devices on which some implementations can operate.

Aspects of the present disclosure are directed to a computing system platform that can gather and recount an individual's journey through life, where such a recounting can, for one or more objects, places, and queries, provide contextualization that can provide insight into the individual's life experience. More particularly, such aspects are directed to, via a personal legacy accountant according to some implementations of the present technology, providing a personal legacy profile including historical accounts for the aforementioned objects, places, and queries from the individual so as to afford associated remembrances that a user of the personal legacy accountant can access. In these regards, such objects can be one or more public records that describe the individual and/or certain happenings during the individual's lifespan. Additionally or in the alternative, such objects can relate to personal records, such as a diary that would not be publicly available. Whether in the case of either public or personal records that can be included in the legacy profile of the individual, such profile can be contextualized by the individual through selective inclusion of one or more items (e.g., records) for the profile. That is, contextualization can be realized where one or more of the public records can be specifically chosen by the individual for inclusion within the legacy profile and one or more of the personal records can likewise be chosen and associated with relevant anecdotes and/or other commentary targeted for the respective records. For instance, a personal record can be a written content item, a visual content item, a sound recording, or any combination thereof.

In some implementations, the one or more personal records can, additionally or in the alternative, recount one or more memories for a particular geographical location that a user of the personal legacy accountant can access while in a vicinity of that location. In still other implementations, the personal legacy accountant can, as part of the one or more personal records, query an individual, who is the subject of the legacy profile, on a myriad of predetermined topics, where responses for the queries can inform the legacy profile to enrich a user's remembrance(s) of the individual. For instance, such queries and responses can be played back to the user according to one or more formats including a timeline of events, responses for one or more user-submitted queries on the individual, or a family tree association for the individual.

In some implementations, the personal legacy accountant can determine, for one or more query/response pairs, that an originally submitted query can be expanded to evoke a wider response for that query. In some implementations, the personal legacy accountant can determine, from a response for the query, that one or more additional individuals are implicated. In this way, the personal legacy accountant can obtain one or more contributions from such individuals that can, for a given query/response pair, supplement a legacy profile. That is, such contributions can offer different experiences or perspectives in regard to a query/response pair associated with an individual who is the subject of the legacy profile.

In one or more cases, access to the personal legacy profile can be conditioned upon the submission of certain credentials and/or the happening of certain events (i.e., triggering events, such as attaining a level of education, getting married). This way, the personal legacy profile can only be viewed by an intended user when certain parameters are satisfied for a user of the personal legacy accountant who attempts access to the legacy profile.

In an example implementation of the present technology, the personal legacy accountant can be implemented via an application that can be executed on a smart device, where the device can scan a QR code affixed to an item by the subject of a legacy profile, e.g., a cookbook of an individual who is the subject of a legacy profile. Upon the scan being executed, a user of the personal legacy accountant can be presented a user interface (UI). Here, the UI can present the user contextualization for entries the user is authorized to access. In some implementations, the personal legacy accountant can, in response to a user-submitted query on certain entries in the cookbook, furnish the user with corresponding contextual information, provided by the subject of the legacy profile. For example, the subject of the legacy profile can provide an entry for her daughter describing the recipe as having been passed down through the female line of their family for generations. This way, the user can, through use of the personal legacy accountant, obtain various remembrances for the individual who is the subject of a legacy profile.

Existing manners of memorializing an individual's legacy and providing remembrances for that legacy primarily rely on manually collecting information items and statically reflecting those items for consumption and interpretation. In other words, systems implementing these memorializations and conveying of associated remembrances lack any ability to interweave an individual's selective aggregation for information items and to append to those items one or more desired contextualizations. For instance, such systems are unable to offer an individual who is the subject of a personal legacy profile an ability to tailor that profile to selectively include particular ones of automatically aggregated public records alongside designating commentary for personal records supplied by the individual. In either one of these instances, or in a combination thereof, existing systems are deficient in providing an individual who is the subject of a personal legacy profile an ability to gather those records which are, from the individual's perspective, characteristic of that individual's life story. By contrast, implementations of the present technology enable an individual who is the subject of a personal legacy profile an ability to personally choose and define an entirety of which information will ultimately define that profile. In other words, through contextualization of information not offered by the existing systems, a personal legacy accountant according to some implementations of the present technology can automatically compile and receive records for the legacy profile to allow an individual the option to selectively build that profile according to the individual's own perspective. As such, and unlike conventional systems, the personal legacy accountant according to some implementations of the present technology can personalize a legacy profile of an individual such that the profile is not generically formulated for the individual.

Several implementations are discussed below in more detail in reference to the figures. FIG. 1 is a block diagram illustrating an overview of devices on which some implementations of the disclosed technology can operate. The devices can comprise hardware components of a device 100 that can memorialize one or more remembrances for a personal legacy profile subject and provide access for those remembrances upon access to the profile being granted. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a personal legacy accountant 164, and other application programs 166. Memory 150 can also include data memory 170, e.g., public records data, personal records data, query topic data, legacy profile access data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
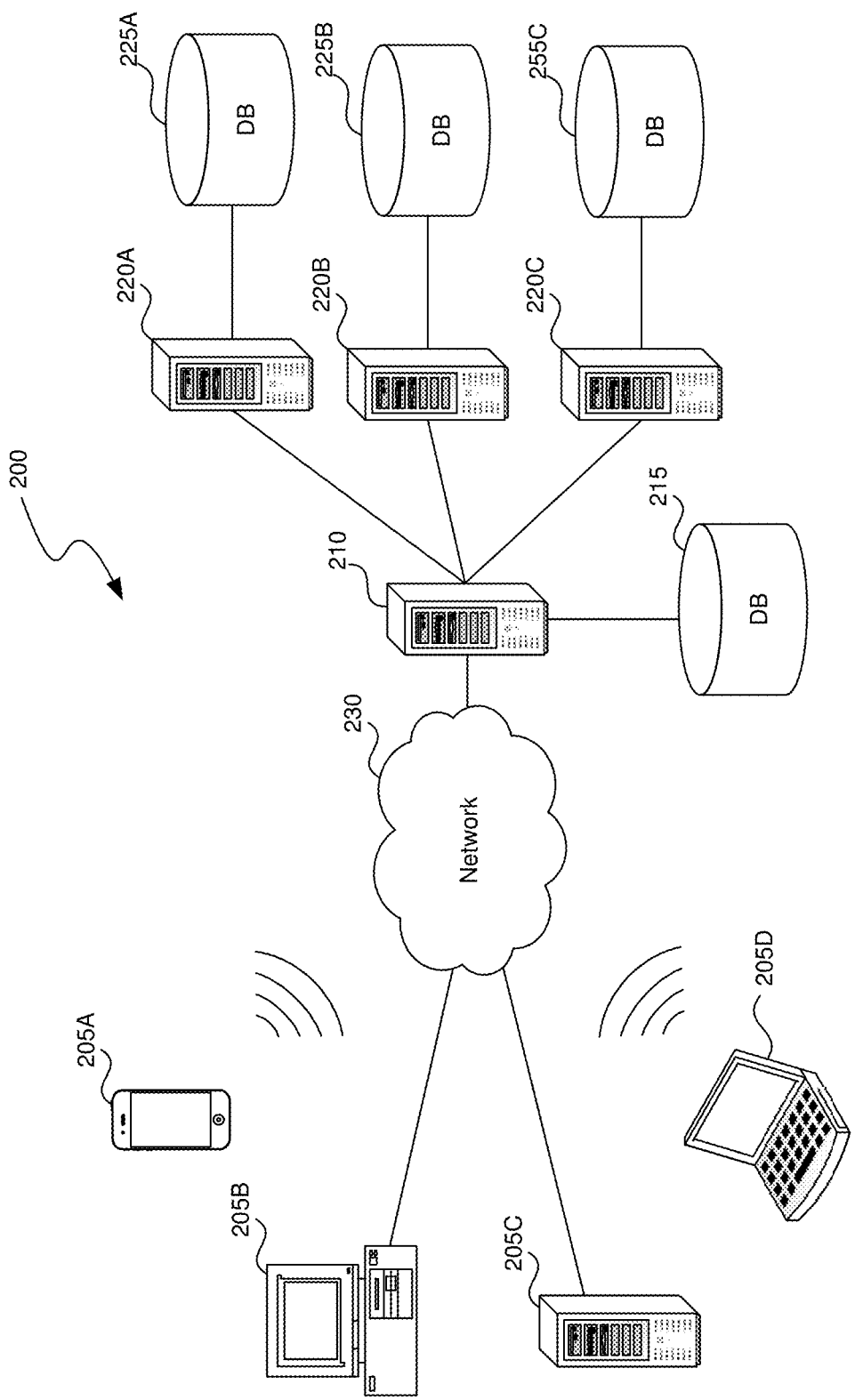
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as public records data, personal records data, query topic data, legacy profile access data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
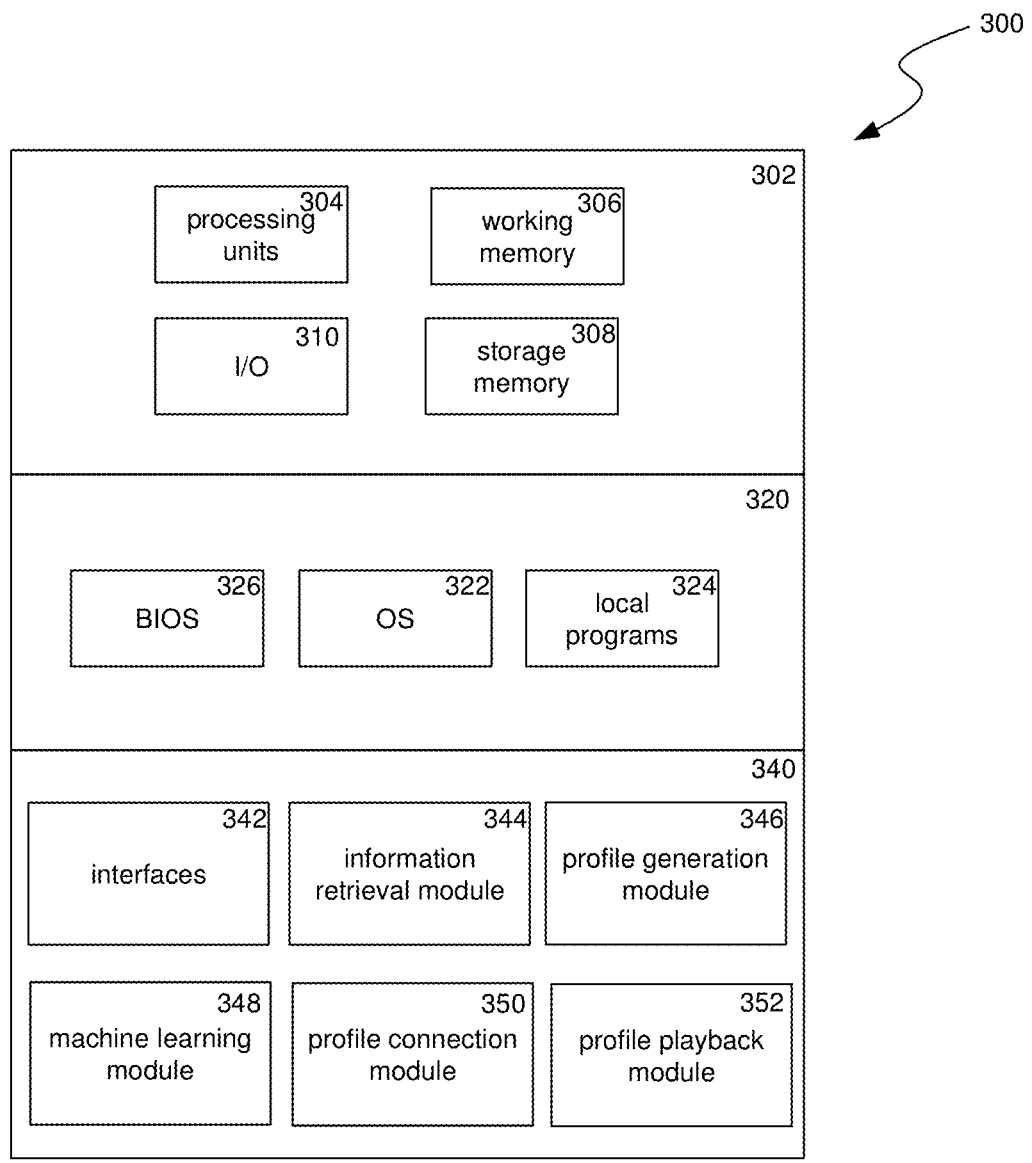
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an information retrieval module 344, a profile generation module 346, a machine learning module 348, a profile connection module 350, and a profile playback module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve information which is necessary to build and access a legacy profile of an individual. For instance, a non-exhaustive list of information that can be used to build the legacy profile can include, for a subject of the legacy profile, identity information of an individual such as that individual's picture, handwriting sample, name, place of birth, date of birth, educational attainment and institution location(s), marriage status, etc. Similarly, data that can be used to access the legacy profile can include many of these same items, in addition to items such as the date of requested access to the legacy profile. In these ways, the legacy profile accountant can, via the information retrieval module 344, compile data for both a subject of the legacy profile as well as for a user of the personal legacy accountant when access to the profile is attempted. Additional details on the types of data that can be retrieved by information retrieval module are provided below in relation to block 402 of FIG. 4, block 502 of FIG. 5, block 602 of FIG. 6A, block 702 of FIG. 7, block 1302 of FIG. 13, and block 1710 of FIG. 17.

In some implementations, profile generation module 346 can generate a legacy profile of an individual. In this regard, such a profile can include documentary records and/or other records, such as verbal passages, corresponding to a legacy profile subject. For example, profile generation module 346 can, using the data retrieved by information retrieval module 344 for building the legacy profile, automatically obtain one or more public records corresponding to the individual (e.g., social media posts, tax records, educational records, etc.). When doing so, profile generation module 346 can, for instance, evaluate one or more relationships between retrieved data (e.g., name, place and date of birth, educational attainment) to determine a likelihood that a public record corresponds to a legacy profile subject. Once obtained, profile generation module 346 can then submit the one or more public records to the subject for approval for inclusion in that individual's legacy profile.

In some implementations, profile generation module 346 can receive one or more personal records supplied by the subject of the legacy profile. A non-exhaustive list of such personal records can include financial information; medical information; insurance information; spoken or written stories, descriptions, or other verbal entries; images or videos; data objects such as family trees or hereditary information; etc. In some implementations, these personal records can be received by profile generation module 346 with an indication of a real-world object where, in turn, profile generation module 346 can then associate the real-world object with a respective personal record. An association for a given real-world object to a personal record can be keyed to a corresponding image profile, a code, or an electronic device that can be interpreted by the personal legacy accountant to identify the real-world object then reveal an associated personal record. In one or more cases, an indication (e.g., a signal) corresponding to the real-world object, can, depending on the association, be generated according to appropriate protocols (e.g., near-field communications). Additionally or in the alternative, profile generation module 346 can receive a location indicated by, for example, GPS coordinates, that the personal legacy accountant can process to reveal a corresponding personal record belonging to legacy profile subject. For one or more of the personal records that can be received by profile generation module 346, such module can further receive contextual data supplied by a legacy profile subject that can contextualize such a personal record. For example, a legacy profile subject can supply a sentiment toward attaining a certain educational achievement, a direction that an accessor of the personal record study a particular entry in a diary, an explanation of a banking scenario, etc.

In some implementations, profile generation module 346 can, sometimes according to predetermined scheduling, query a legacy profile subject for verbal passages for the profile. To do so, profile generation module 346 can submit to the legacy profile subject, in regard to one or more predetermined topics, and record attendant responses. As a result of the recording, profile generation module 346 can, in some implementations, invoke natural language processing on the responses to, using the relevant query topic and labeling for the response, automatically assign a descriptor for a given response. Through use of the descriptor, profile generation module 346 can evaluate whether one or more required descriptor categories are satisfied, such that a complete response for the query had been obtained. In a case in which a deficit for the categories is evaluated (i.e., a descriptor in one or more required categories is not identified), profile generation module 346 can, following the evaluation, submit to the legacy profile subject an expanded query with the goal of obtaining a descriptor in each of the required categories. In these ways, profile generation module 346 can, at a time adjacent to a response for a submitted query, endeavor to achieve a most comprehensive response for that query. In some implementations, such an effort can include identifying one or more additional individuals, other than the legacy profile subject, who may have contributions for an original and/or expanded query and their respective responses by a legacy profile subject. In still other implementations, profile generation module 346 can receive from a legacy profile subject one or more queries intended to result in respective responses that such an individual desires to have included in her legacy profile. Additional details on the legacy profile generation performed by profile generation module 346 are provided below in relation to blocks 404, 406, 408, 410, and 412 of FIG. 4; blocks 510, 512, and 514 of FIG. 5; blocks 604 and 606 of FIG. 6A; FIG. 6B; blocks 1304, 1306, 1308, and 1310 of FIG. 13; and FIGS. 14-16.

In some implementations, machine learning module 348 can include one or more machine learning models that intake one or more items of identity information of a legacy profile subject to determine one or more corresponding identity verifiers. As examples, such verifiers can include curvature patterns on lettering for the individual's handwriting, distinguishing facial characteristics for the individual, voice characteristics, hair, eye, and skin coloring, location information, etc. To carry out the determination, machine learning module 348 can convert the identity information into machine learning model input. Machine learning module 348 can then apply that input to a trained machine learning model that can then generate one or more personal identity verifiers for the legacy profile subject. Additional details on the determination of personal identity verifiers by machine learning module 348 are provided below in relation to blocks 504, 506, and 508 of FIG. 5. Machine learning module 348 can also include one or more machine learning models that intake identifiers for real-world objects-such as images, location information, etc. and output matches to keys with associated context information values. Additional details on identifying real-world objects corresponding to legacy profile entries are provided below in relation to FIG. 9.

In some implementations, profile connection module 350 can assemble component records (i.e., public records, personal records, verbal passages) for a legacy profile by multiple users—e.g., those identified by the legacy profile subject or those on a family tree of the legacy profile subject. Thus, in some implementations, profile connection module 350 can create linkages to, for instance, family members implicated according one or more public records, personal records, and/or query/response pairs corresponding to a legacy profile subject. Accordingly, a user can access linked records from multiple users associated with the legacy profile and their contextual data. Additional details on the assemblies that can be made by profile connection module 350 are provided below in relation to block 706 of FIG. 7 and block 1714 of FIG. 17.

In some implementations, profile playback module 352 can, for a given legacy profile, determine access to the profile and also a playback format for the profile. In regard to access, profile playback module 352 can evaluate, for a user of the personal legacy accountant who attempts access to an individual's profile, whether access criteria are satisfied. For example, profile playback module 352 can determine whether certain access parameters specified by a legacy profile subject are fulfilled (e.g., whether the user has attained a certain level of education, whether the user has attained a certain age, whether the user has performed a certain task prescribed the legacy profile subject).

Profile playback module 352 can also, according to either a selection for the format as chosen by a user of the personal legacy accountant or a prescribed format elected by the legacy profile subject, exhibit a corresponding legacy profile for which access has been granted. It is contemplated that exemplary formats can include one or more of a timeline demonstration of events related to the legacy profile, a query/response demonstration in which responses from the profile are provided for queries submitted by a user, or a family tree demonstration where items for the profile are associated with the legacy profile subject and respective family relations. It is further contemplated that one or more of these demonstrations can be delivered to a user in written form and/or verbally. For instance, an electronic device executing the personal legacy accountant could be formatted to display and/or verbalize legacy profile items according to a particular playback format. This way, for instance, intonation of a legacy profile subject's voice when delivering contextual information for a profile item can be provided to a user of the personal legacy accountant. As such, the aforementioned playback by the personal legacy accountant is just one way that the accountant can, unlike existing systems, enrich a user's experience for a legacy profile. Additional details on operations of the profile playback module 352 are provided below in relation to blocks 704 and 706 of FIG. 7, and FIG. 17.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
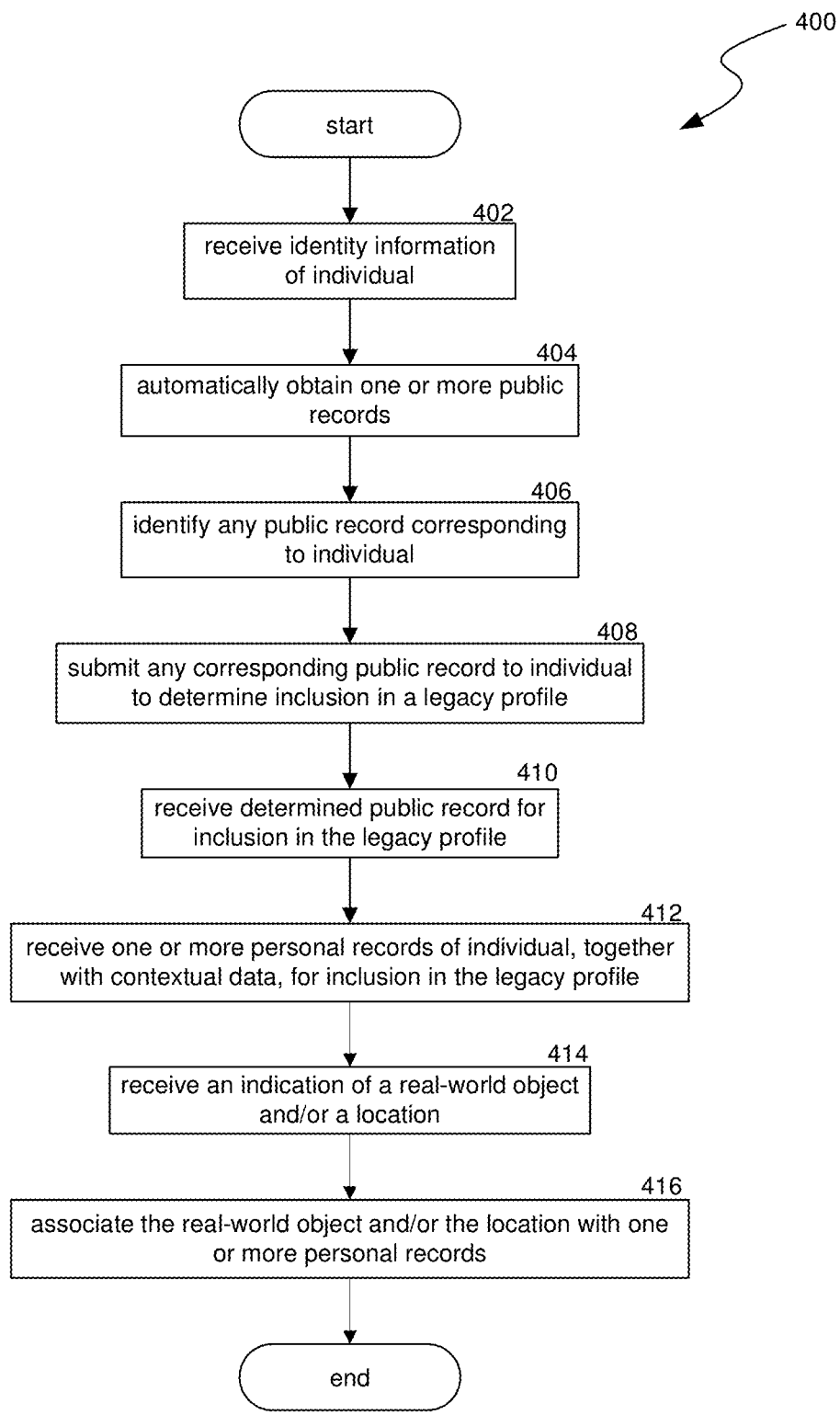
FIG. 4 is a flow diagram illustrating a process used in some implementations for generating a legacy profile of an individual using automatically obtained public records and one or more personal records supplied by the individual.

FIG. 4 is a flow diagram illustrating a process 400 used in some implementations for generating a legacy profile of an individual using automatically obtained public records and one or more personal records supplied by the individual. Process 400 can be initiated in response to the individual desiring creation of her legacy profile. One or more portions of process 400 can be performed according to an application that can be executed on a server for personal legacy accountant 164; alternatively, one or more portions of process 400 can be performed on a client device executing the application.

At block 402, process 400 can receive identity information of the individual who is the subject of a legacy profile, where that information can be used to build the legacy profile. Some particular types of such information include that individual's picture, facial features, identity numbers or handles, voice samples, handwriting sample, name, place of birth, date of birth, educational attainment and institution location(s), marriage status, prior relationships, employment history, residence history, etc. In some implementations, one or more of these items can be solicited from a user of the personal legacy accountant 164 when that user attempts to access the legacy profile for the individual. In these ways, such information can serve the dual purposes of enabling a legacy profile to be constructed and confirming that access criteria for that profile are satisfied.

At block 404, process 400 can automatically obtain one or more public records to match with the subject of the legacy profile at block 406. Particular types of public records that can be obtained can include, for instance, social media posts and/or profiles, court filings, property tax records, birth records, marriage records, educational records, military service records, published photographs and articles, publications for family or other associations, published organization memberships, and/or publicly available location data.

At block 406, process 400 can identify one or more public records corresponding to the legacy profile subject. In other words, with one or more of the identity information obtained at block 402, process 400 can, for instance, compare relevant relationships for that identity information with respect to a public record in order to confirm that a given public record pertains to the legacy profile subject. In some cases, these public records can be matched by process 400 applying a machine learning model that is trained to match the identity information from block 402 (such as facial features or voice characteristics) to features of the public records and/or by algorithmically matching values from the identify information (such as name and birthdate) to the corresponding values set for the public records. In a particular case, for example, process 400 can evaluate a residence history for the legacy profile subject to arrive at the likelihood that a published organization membership listing reflecting that residence history is a public record that actually corresponds to the subject. In another case, for example, process 400 can evaluate employment and residence history against publicly available location data to determine that one or more social media posts were originated by the legacy profile subject.

At block 408, process 400 can submit a corresponding public record to the legacy profile subject for a determination thereby as to whether the particular record ought to be included in her legacy profile. That is, for each corresponding public record submitted to the legacy profile subject, process 400 can provide the subject a choice as to whether a respective record should be included in her legacy profile. In this way, the legacy profile subject can verify whether public records are actually referencing her and can control which public records are available to form conclusions about her legacy when the corresponding profile is accessed.

At block 410, process 400 can receive, from the legacy profile subject, one or more public records determined for inclusion in her legacy profile.

At block 412, process 400 can receive, from the legacy profile subject, one or more personal records of the legacy profile subject that the subject desires to be included in her legacy profile. In some implementations, a personal record can be a writing, a visual, a sound recording, or any combination thereof. A non-exhaustive list of exemplary types of personal records can include banking information, medical records, insurance records, non-public military records, diary entries, voice recordings, textual entries, images, videos, etc. As is explained hereinbelow, one or more of these personal records can be derived from or associated with a real-world object or a particular location relevant to the legacy profile subject.

At block 414, process 400 can receive an indication of a real-world object and/or a location. In these regards, such an indication can be, for example, a wireless signal transmitted from an electronic device (e.g., an RFID, GPS, WiFi, ultra-wideband, Bluetooth, IR, or other wireless devices) affixed to the real-world object. Similarly, such an indication can be a QR code affixed to the real-world object. In some implementations, the received indication can be an image of a real-world object. In still other implementations, process 400 can receive an indication of a location, where the indication includes detection of coordinates for the location. In some cases, the indication can include a combination of these—such as an image and a location.

At block 416, process 400 can associate the real-world object and/or the location to one or more of the personal records received at block 412. In doing so, as in the case of the aforementioned electronic device and QR code, process 400 can match data conveyed for the device, QR code, or recognition of an image of the object as a key to access the to a respective personal record. In a case in which an indication of a real-world object is provided by an image for that object, when a user provides process 400 with the object image process 400 can recognize that object according to a corresponding image profile (e.g., using an image recognition machine learning model). For example, image parameters can be interpreted by a machine learning model trained to identify objects using, for example, shape, shading, contour, depth, surface area. In some implementations, one or more real-world objects associated with a personal record can be associated with a corresponding location for which an indication was received at block 414. In some implementations, the location for which an indication was received at block 414 can itself be associated with a personal record for the legacy profile subject. In some cases, the real-world object can be associated with an image and location, allowing process 400 to match the provided image to objects with locations also matching a current vicinity—thereby increasing result accuracy.

Figure 5:
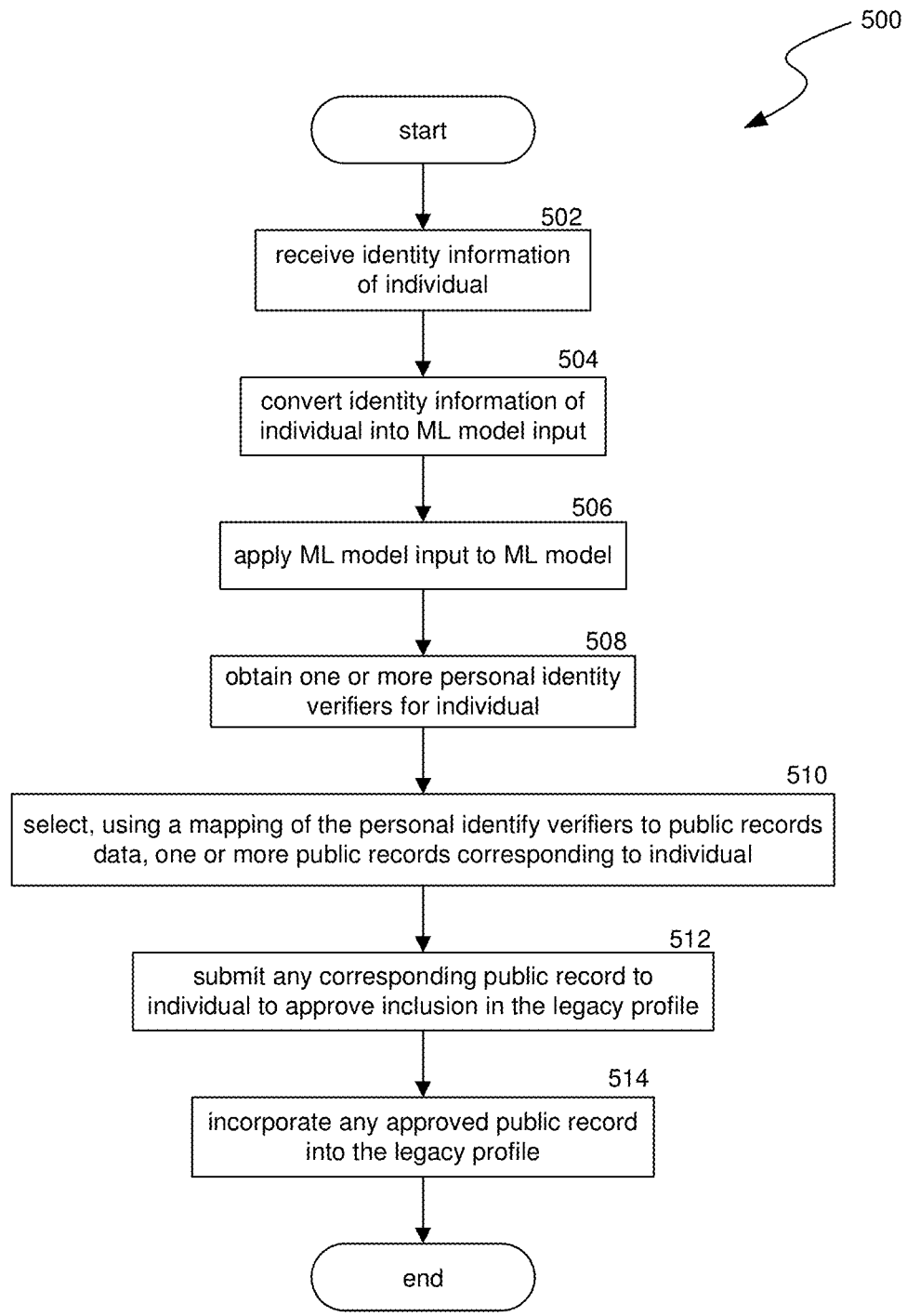
FIG. 5 is a flow diagram illustrating a process used in some implementations for obtaining one or more public records later approved by an individual for inclusion in a legacy profile of the individual.

FIG. 5 is a flow diagram illustrating a process 500 used in some implementations for obtaining one or more public records later approved by a legacy profile subject for inclusion in a corresponding legacy profile. Process 500 can be initiated in response to a legacy profile subject desiring to create her legacy profile (which may include providing authorization for one or more public records to be acquired and vetted for inclusion in that profile). One or more portions of process 500 can be performed according to an application that can be executed on a server for personal legacy accountant 164; while, in some cases, one or more portions of process 500 can be performed on a client device that can be in communication with servers and/or databases providing repositories for public records.

At block 502, process 500 can receive identity information of the legacy profile subject, where the identity information can be the same or similar to the information described with reference to block 402 of FIG. 4.

At block 504, process 500 can convert the received identity information into machine learning model input. For example, a picture of the legacy profile subject, an image of a handwriting sample and/or statistical data (collectively "identity information") of that subject can be converted into a histogram, as applicable, or other numerical data that the machine learning model has been trained to receive.

At block 506, process 500 can apply the machine learning model input to a machine learning model. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deep, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The machine learning model can be trained with supervised learning and use training data that can be obtained from identity information of a legacy profile subject. More specifically, each item of the training data can include an instance of an identity information item matched to an identity for the subject. The matching can be performed according to known relationships for the identity information and identities. For instance, the matching can be a result of different forms of the subject's signature corresponding to the identity of the subject. During the model training a representation of the identity information (e.g., histograms of the images, values representing the identity information, etc.) can be provided to the model. Then, the output from the model, personal identity verifiers for the subject's identity, can be compared to the actual identity and, based on the comparison, the model can be modified, such as by changing weights between nodes of the neural network or parameters of the functions used at each node in the neural network (e.g., applying a loss function). After applying each of the pairings of the inputs (identity information corresponding to the legacy profile subject) and the desired output (corresponding identity verifiers) in the training data and modifying the model in this manner, the model is trained to evaluate new instances of identity information for the personal legacy subject in order to confirm an identity of that subject.

At block 508, process 500 can, for the identity information received at block 502, obtain one or more personal identity verifiers (e.g., curvature patterns in lettering for a handwriting sample, distinctive facial features, relationships for past residences, vocal features, name, birthdate, etc.), based on the model output from block 506.

At block 510, process 500 can select, using a mapping of the personal identity verifiers to public records data, one or more public records corresponding to the legacy profile subject. In this regard, selections can be the result of comparisons for the personal identity verifiers against public records which are available in relevant public records repositories. As an example, process 500 can, for mapped verifiers, select a newspaper article featuring an image of the legacy profile subject and her birthdate. As another example, process 500 can, as a result of verification for the subject's signature, select a court filing to which that signature is affixed.

In some implementations, instead of the machine learning model producing personal identity verifiers, the machine learning model can be trained to take user characteristic identifiers which are depicted in a public record (e.g., facial features, voice features, name, birthdate, etc.) and produce a match score indicating a likelihood that a person depicted in the public record is the legacy profile subject. Where the match score is above a threshold value (e.g., 85%), process 500 can select the public record as a match to the legacy profile subject for approval to be include in the legacy profile.

At block 512, process 500 can submit any selected public record to the legacy profile subject for approving that record's inclusion within the legacy profile. This way, the subject is provided the opportunity to verify the public record is about them and to explicitly contextualize the legacy profile according to her perspective toward the proffered public record (i.e., provide additional description which can then be linked to the public record in the legacy profile).

At block 514, process 500 can, for any public record approved by the legacy profile subject, incorporate such a record within the subject's legacy profile.

Figure 6A:
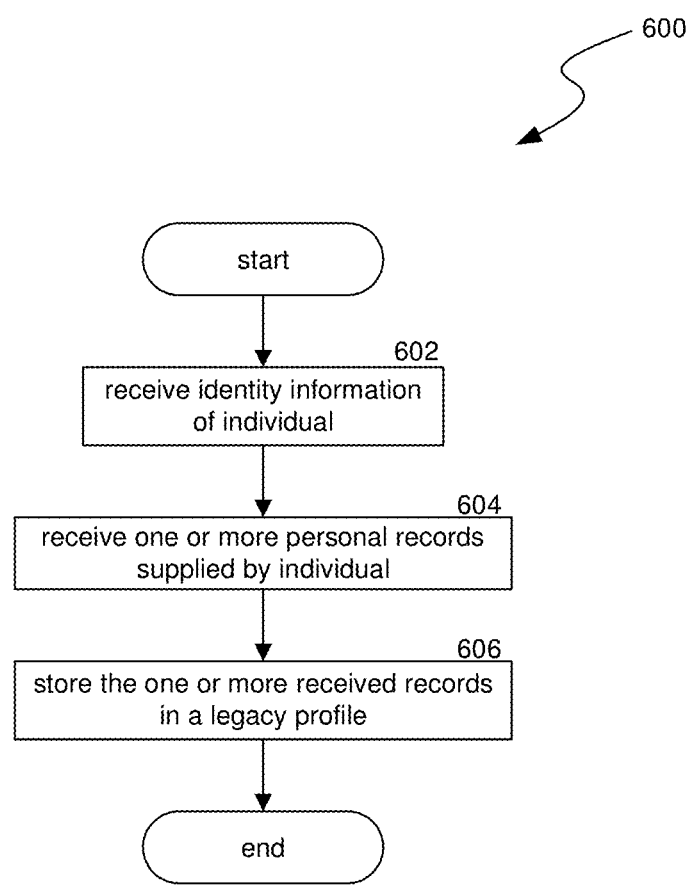
FIG. 6A is a flow diagram illustrating a process used in some implementations for obtaining one or more personal records of an individual to be included in a legacy profile of the individual.
Figure 6B:
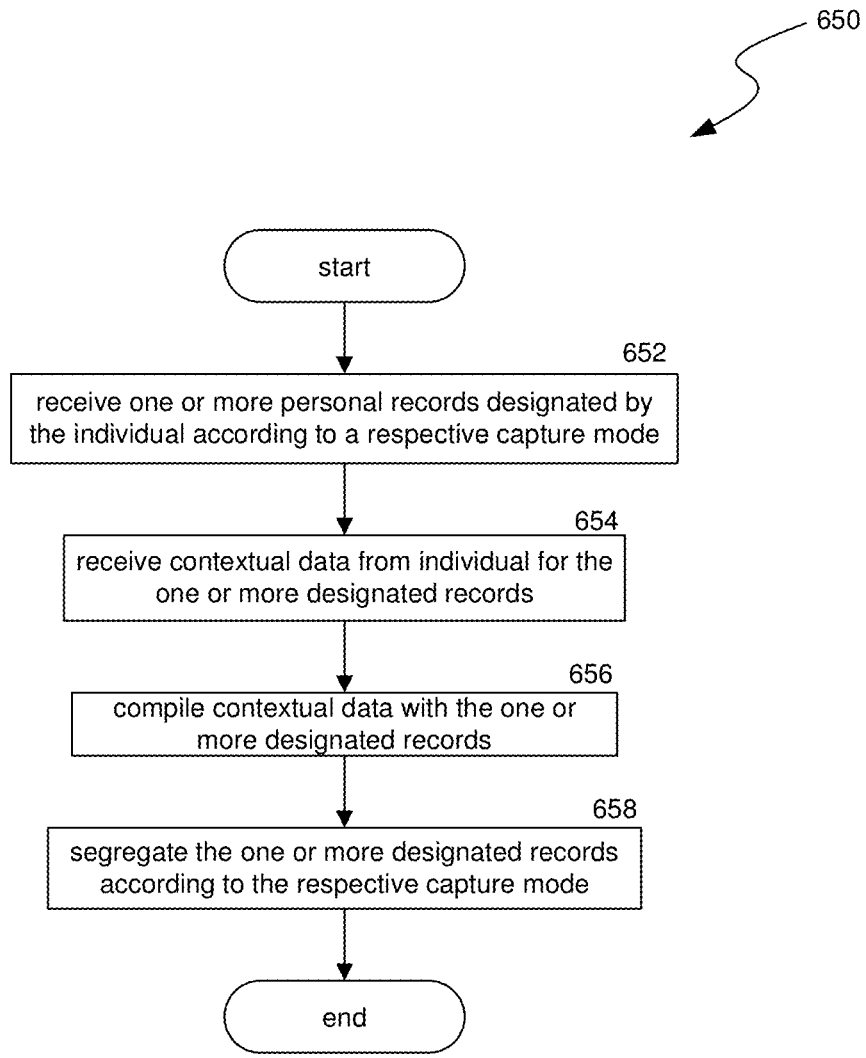
FIG. 6B is a flow diagram illustrating a process used in some implementations for designating, by an individual, one or more personal records associated with contextual data which can be included in a legacy profile of the individual.

FIG. 6A is a flow diagram illustrating a process 600 used in some implementations for obtaining one or more personal records of an individual to be included in a legacy profile of the individual. Process 600 can be initiated as a result of a legacy profile subject wanting to include one or more personal records within her legacy profile, where the personal records can stem from an association between a real-world object and a respective personal record. One or more portions of process 600 can be performed according to an application that can be executed on a smart device for identifying real-world objects for personal records; and in some cases, one or more portions of process 600 can be executed by a server in communication with the smart device—e.g., for providing a mapping of real-world objects that can be applicable for personal records.

At block 602, process 600 can receive identity information of the legacy profile subject, where, as discussed with reference to block 402 of FIG. 4, such information can serve to define a personal identity of the legacy profile subject.

At block 604, process 600 can receive one or more personal records supplied by the legacy profile subject. In some implementations, a personal record can be a writing, a visual, a sound recording, or any combination thereof. A non-exhaustive list of exemplary types of personal records can include banking information, medical records, insurance records, non-public military records, diary entries, voice recordings, textual entries, images, videos, etc.

At block 606, process 600 can, for the identity information received at block 602, store the one or more personal records as entries for the legacy profile of a corresponding subject.

FIG. 6B is a flow diagram illustrating a process 650 used in some implementations for designating, by an individual, one or more personal records associated with contextual data which can be included in a legacy profile of the individual. Process 650 can be initiated in response to a legacy profile subject desiring that one or more personal records be included within her legacy profile, where receipt of a personal record can be the result of receiving an indication of real-world object that can correspond to that personal record. Process 650 can be initiated during interactions by the legacy profile subject with a real-world object, and can be performed on a server system in control of an application for those interactions or on a client device operating the controlling application. In some implementations, process 650 can be performed as a sub-process of process 600 of FIG. 6A, e.g., at block 606. For instance and where the legacy profile subject desires to add a personal record to her legacy profile, the subject can operate the client device to recognize an association between the real-world object and the personal record. Upon recognition, the subject can then append contextual data that can further contextualize the real-world for the personal record.

At block 652, process 650 can receive one or more personal records designated by the legacy profile subject according to a respective capture mode. In this regard, manners of designation (i.e., association) can encompass capture modes such that personal records can be realized after corresponding capture modes are executed. Such manners of designation can be applicable for real-world objects (e.g., books, documents, furniture, clothing, etc.) since associations for such objects can be readily interpreted by one or more computing systems. In some implementations, an association between a real-world object and a personal record can be fulfilled according to an image profile for the real-world object that specifies certain parameters that a computer vision system can recognize to provide that object. For instance, the image profile can be one or more images of the real-world object that a machine learning model can be trained match to additional object images. That is, images or image features can be stored for a real-world object when images of the real-world object are provided by the legacy profile subject. Later, when a user accesses the legacy profile and provides images of a real-world object, the machine learning model can provide an estimation of whether they are the same object. In some implementations, an association to a real-world object can be realized through computerized interpretation of a QR code affixed to that object. For example, process 650 can provide a QR code that the user can print and affix to the real-world object or the user can have a QR code (e.g., as a sticker) that they can register with process 650 to be associated with the real-world object. In still further implementations, an electronic device, such as an RFID tag, Bluetooth device, WiFi tracking device, GPS device, or other wireless electronic device, can be affixed to a real-world object where a computer system receiving a wireless signal (e.g., radio frequency (RF) signaling) from the tag can interpret an association to a particular real-world object. Alternatively or in addition to the above capture modes, one or more associations can be made by the legacy profile subject according to designation by geographical location. For instance, association of a personal record by a legacy profile subject can be made according to that subject specifying GPS coordinates that can be detected by an electronic device (e.g., mobile phone). In these ways, a legacy profile subject can selectively choose a specific manner by which a real-world object and/or location can be associated with one or more personal records which are chosen to be components of a corresponding legacy profile. Thus, the object image, QR code (or other code such as a bar code, character sequence, etc.), electronic signal, and/or location designation, can be a key that when identified can direct a viewer of a legacy profile to the corresponding record in the legacy profile (i.e., with contextual data discussed below).

At block 654, process 650 can receive contextual data from the legacy profile subject for one or more designated personal records. That is, the subject can, upon the association for a real-world object and/or location being provided, enter contextual data that completes the personal record for that real-world object (as further discussed below in relation to FIGS. 9-12). In these regards, examples of contextual data can include a message, instructions, one or more symbols defining a mark-up (where the object is a document, for example), a story, images, video, etc. that can impart, e.g., information or sentiments, that the legacy profile subject wishes to be expressed for a given real-world object and/or location. In some implementations, one or more of these exemplary contextual data can be included in the personal record as part of a virtual reality representation for a real-world object and/or location, or as a 3D recording of the legacy profile subject for the real-world object and/or location. In these ways, each of the representation and the recording can themselves define contextual data for a real-world object and/or location.

At block 656, process 650 can compile the received contextual data for a respective personal record associated to a real-world object and/or location. This way, contextual data for real-world objects and/or locations can, upon being accessed via personal legacy accountant 164 (as discussed below with reference to FIGS. 12A-12C), convey one or more reasons or interests as to why a legacy profile subject thought it desirable to include a particular personal record.

At block 658, process 650 can segregate each designated personal record according to its respective capture mode. In doing so, process 650 can bundle personal records according to a like capture mode such that queuing of those records when accessed through the personal legacy accountant 164 is made most efficient.

Figure 7:
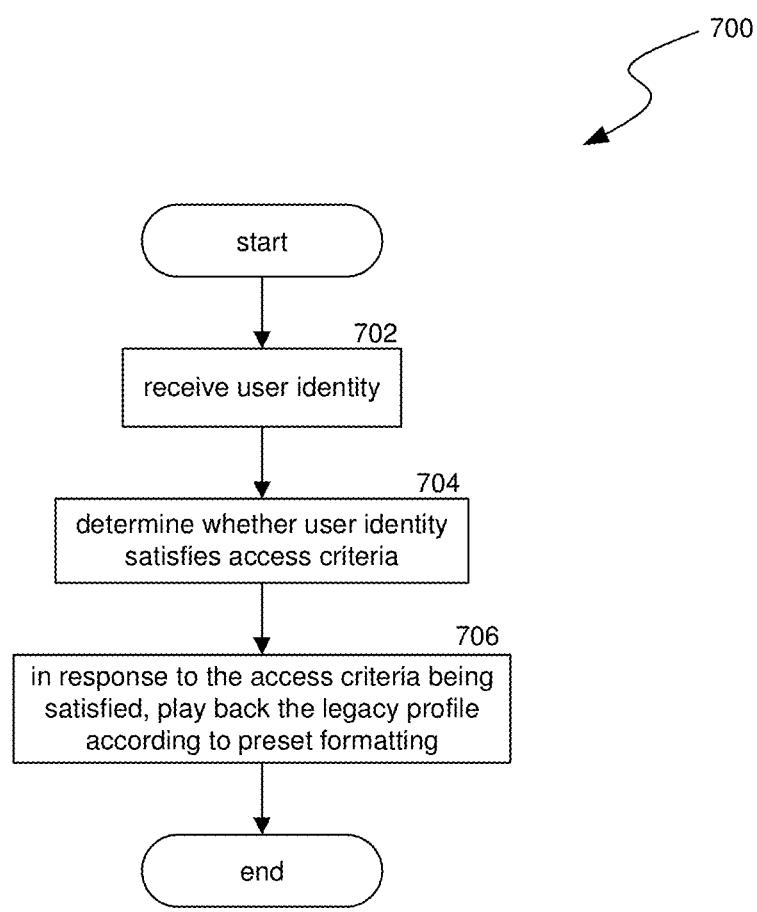
FIG. 7 is a flow diagram illustrating a process used in some implementations for granting access to a legacy profile of an individual.

FIG. 7 is a flow diagram illustrating a process 700 used in some implementations for granting access to a legacy profile of an individual. Process 700 can be initiated when a user of personal legacy accountant 164 desires to access a legacy profile of an individual. In some implementations, process 700 can be initiated when that user causes one or more real-objects and/or locations to be associated with one or more respective personal records in a legacy profile. For example, process 700 can be initiated by a user scanning a QR code affixed to a real-world object that is associated with a personal record of an individual's legacy profile. Thus, one or more portions of process 700 can be performed according to an application that can be executed on a server for personal legacy accountant 164; alternatively, one or more portions of process 700 can be performed on a client device executing the application.

At block 702, process 700 can receive user access identity information that can unlock access to a legacy profile for the individual so that certain public and/or personal records be shared after that individual has passed. Exemplary types of such information can include, for example, the user's handle, password, name, date of birth, etc.

At block 704, process 700 can determine whether the user's identity satisfies access criteria specified by the legacy profile subject for the legacy profile. As can be understood with reference to FIG. 21, such a determination can, in some implementations, be influenced by the user's responses for access information including the requested date of access and, for example, certain biographical information that can be compared for the user's identity and requested date of access. For example, if a legacy profile subject had specified the access criterion that her grandson had graduated college before access would be granted, then a negative response or inspection of birth date and requested access date could result in access being denied. As another example, if a user responds that she is married at the time of the requested access date, then process 700 could, on the basis of marriage being an access criterion, automatically determine that access to the requested legacy profile be granted.

Figure 20B:
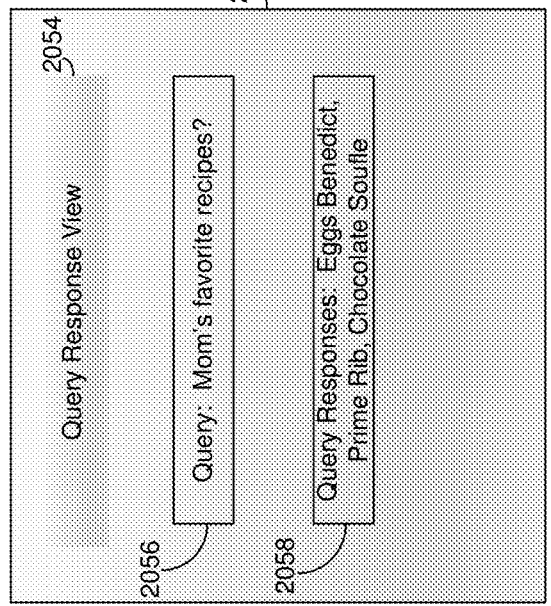
FIG. 20B is a conceptual diagram illustrating, according to some implementations of the present technology, a UI demonstrating accessing a legacy profile of an individual according to a query/response view for the profile.
Figure 20A:
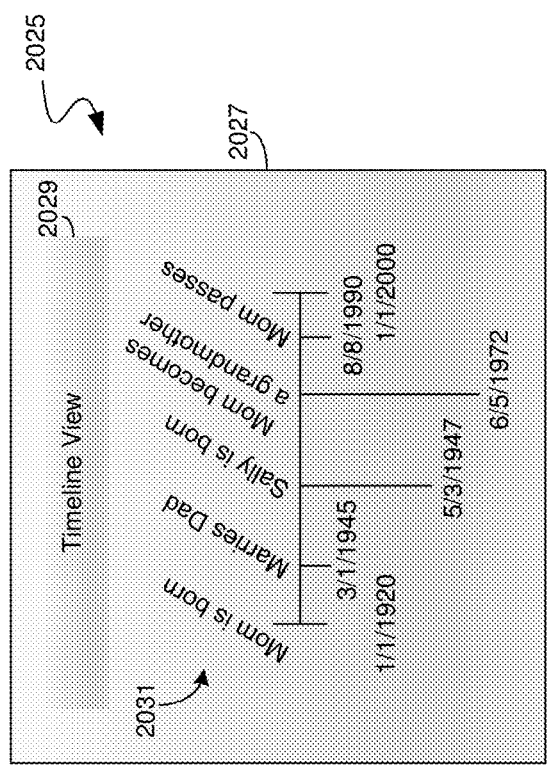
FIG. 20A is a conceptual diagram illustrating, according to some implementations of the present technology, a UI demonstrating accessing a legacy profile of an individual according to a timeline view for the profile.
Figure 20C:
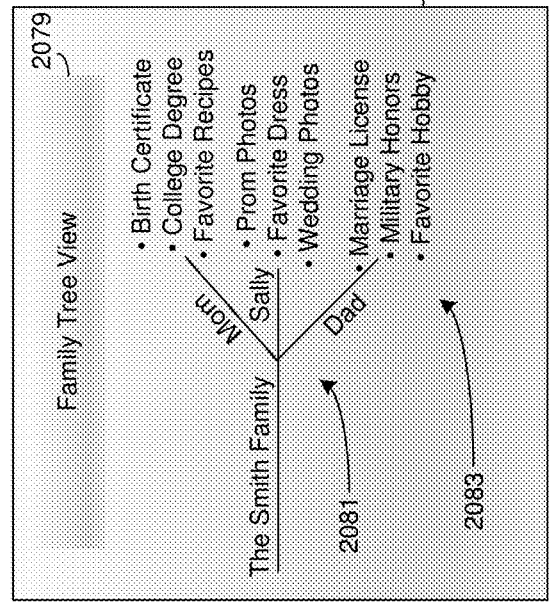
FIG. 20C is a conceptual diagram illustrating, according to some implementations of the present technology, a UI demonstrating accessing a legacy profile of an individual according to a family tree view for the profile.

At block 706, process 700 can, in response to access criteria for the legacy profile being satisfied as a result of the determination made at block 704, play back the corresponding legacy profile according to a selected formatting. In various cases, the playback format of the profile can be deemed in advance by the legacy profile subject, selected by the user requesting access, or set to a default or selectively implemented by a computing system in control of the playback. In this latter instance, the implementation can be according to system operating constraints and/or evaluations for a most efficient presentation of the profile. In other words, because playback formats can include textual, graphical and/or audio components (such as may be the case for an available virtual reality presentation featuring the legacy profile subject), the controlling system can operate to present components for a legacy profile in a manner which is operationally least burdensome. Doing so can be impactful to an ability of the user to be presented an entirety of a legacy profile since the same may encompass large amounts of data. In various implementations, the playback format can be a timeline view, a view provided in response to a user query, or a family tree view (as illustrated in FIGS. 20A-C). In other cases, the playback format can be for a particular record in the legacy profile—e.g., provided upon the viewing user providing an image, QR code, or electronic signal keyed to the legacy profile record, as discussed above.

Figure 8:
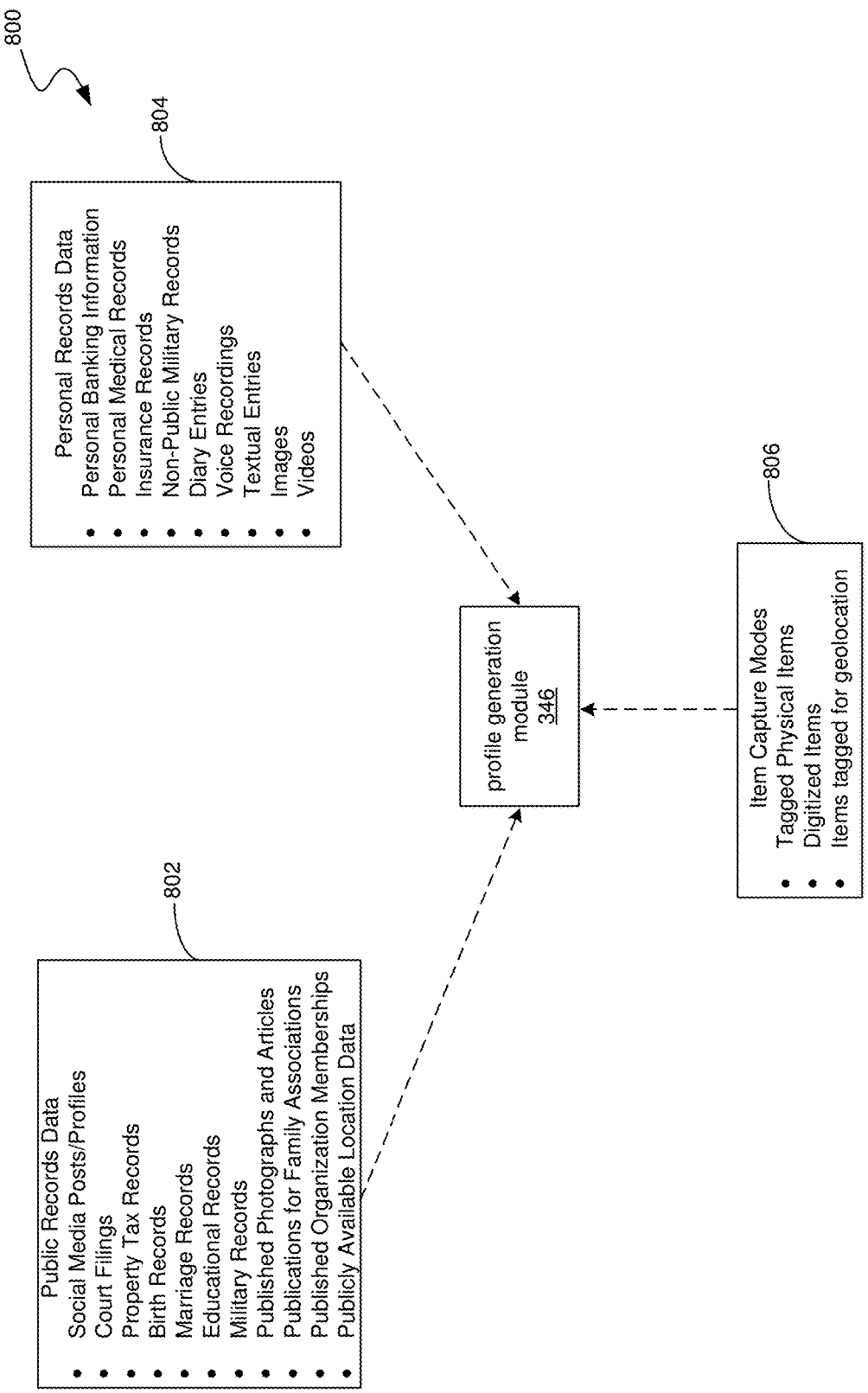
FIG. 8 is a conceptual diagram illustrating, according to some implementations of the present technology, compilation of various types of data that can define a legacy profile of an individual.

FIG. 8 is a conceptual diagram illustrating, according to some implementations of the present technology, compilation of various types of data that can define a legacy profile of an individual. As shown, such types of data can include public records data 802 and personal records data 804, where the particular data types for compilations are merely exemplary of data that can be included in a legacy profile of an individual. As has been discussed with reference to block 652 of FIG. 6B, personal records that can form items for a legacy profile can be associated to those records in accordance with one or more corresponding capture modes 806. Where a particular item for a legacy profile is an automatically obtained public record approved by a legacy profile subject for inclusion in her profile or where an item is a personal record supplied according to a capture mode 806, profile generation module 346 can receive both of the items as components for the profile. In doing so, and according to permissioning for creation of a legacy profile, profile generation module 346 can compile the aforementioned records for playback to a user satisfying access criteria for the profile.

Figure 9:
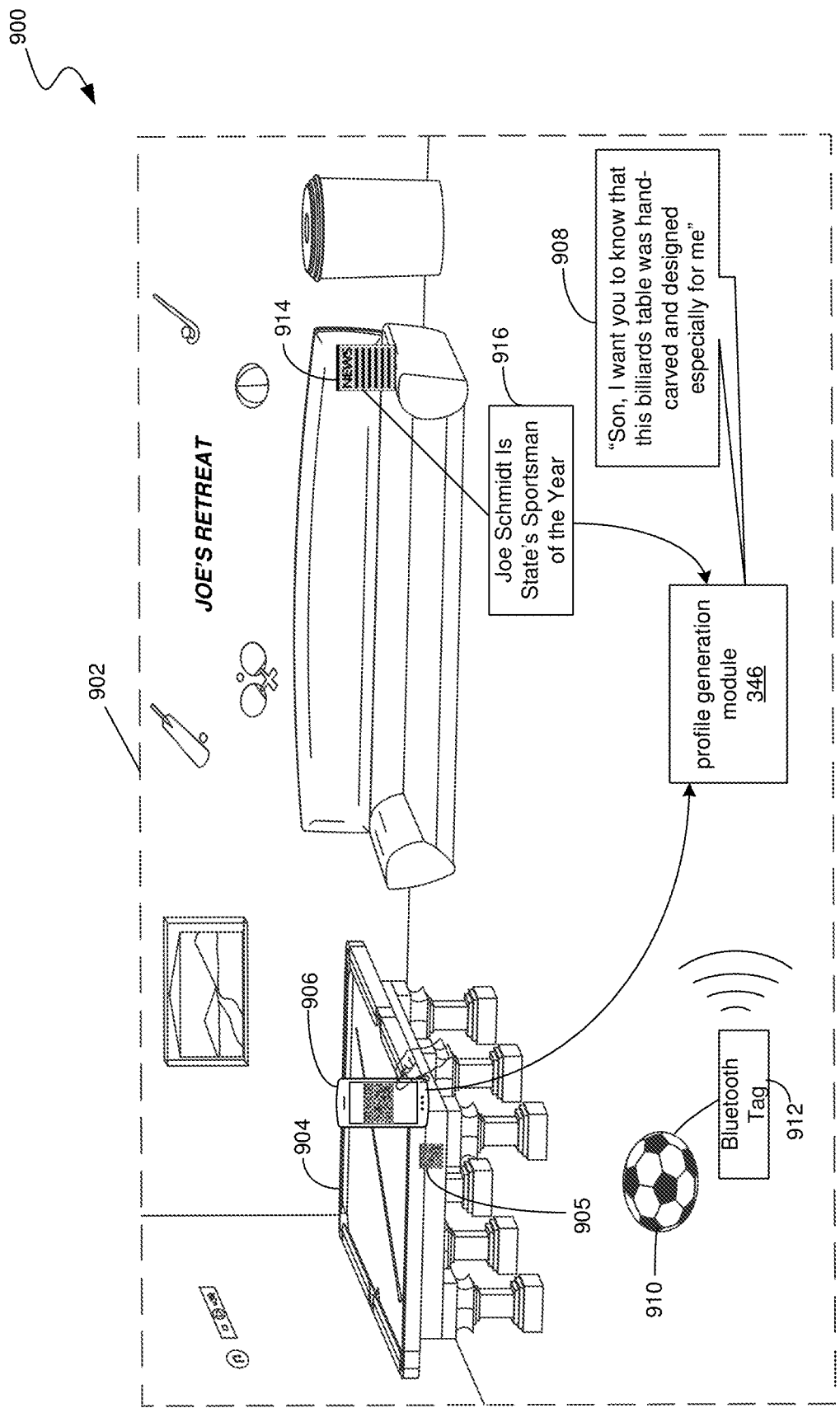
FIG. 9 is a conceptual diagram illustrating, according to some implementations of the present technology, accessing one or more personal records associated with one or more real-world objects designated for a legacy profile of an individual.

FIG. 9 is a conceptual diagram 900 illustrating, according to some implementations of the present technology, associating one or more legacy profile records with one or more real-world objects. More specifically, diagram 900 illustrates compilation of data, from an exemplary game room 902, such as the shown "Joe's Retreat," from both automatically obtained public records and personal records supplied by a legacy profile subject for his legacy profile. In each case, profile generation module can be implemented by a smart device, such as the shown smartphone 906.

In a first instance and as a result of a legacy profile subject scanning a QR code 905 affixed to a real-world object (here a billiards table 904), profile generation module 346 can receive the QR code as a key for the object, to associate with a legacy profile record. Using this key, profile generation module 346 can associate the billiards table 904 real-world object with a personal record selected by the legacy profile subject for the table. This selected record can include contextual data 908 supplied by the legacy profile subject. Here, in this exemplary case, such contextual data 908 relays Joe's reminder providing that, "Son, I want you to know that this billiards table was hand-carved and designed especially for me."

In a second instance, profile generation module 346 can receive an key (i.e., a wireless signal) corresponding to real-world object soccer ball 910 via an associating Bluetooth tag 912. Though not shown, profile generation module 346, as in the case of real-world object billiards table 904, is then equipped to associate a corresponding personal record, with any supplied contextual data, to the soccer ball 910 via the key wireless signal.

Alongside personal records data that can be accessed according to profile generation module 346, a user can further provide one or more automatically obtained public records that may pertain to a legacy profile subject. For example, the headline 916, "Joe Schmidt is State's Sportsman of the Year," as compiled from a publicly available news publication 914, can be accessed in accordance with a corresponding legacy profile. At the discretion of the legacy profile subject, profile generation module 346 can generate a legacy profile for public and/or personal records of a legacy profile subject.

Figure 10:
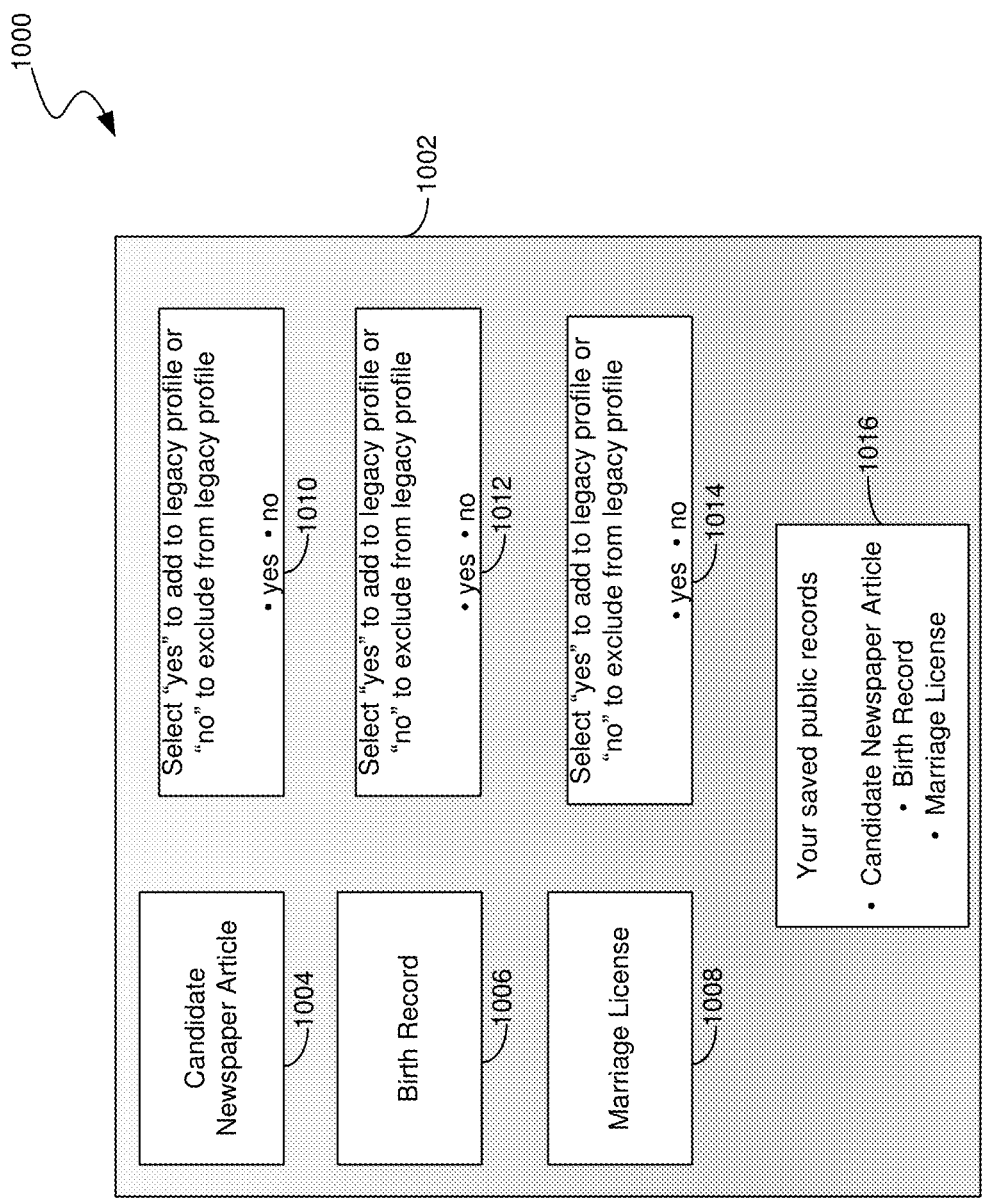
FIG. 10 is a conceptual diagram illustrating, according to some implementations of the present technology, a user interface (UI) according to a personal legacy accountant.

FIG. 10 is a conceptual diagram 1000 illustrating, according to some implementations of the present technology, a user interface (UI) 1002 according to a personal legacy accountant 164 executing the process of FIG. 5. Therein, the UI 1002 can present, for various automatically obtained public records 1004, 1006, and 1008 representing, respectively, a candidate newspaper article, a birth record, and a marriage license, corresponding input fields 1010, 1012, and 1014. In some cases, the public records 1004, 1006, and 1008 can be selectable (not shown) for the legacy profile subject to view the full public record. Each of the input fields can present to a legacy profile subject an option as to whether a corresponding public record automatically obtained by personal legacy accountant 164 ought to be included in that subject's legacy profile. For example, the subject can respond "yes" or "no" with respect to a particular record. Depending on the subject's responses, personal legacy accountant 164 can compile those automatically obtained records for which the subject indicated approval by selecting "yes." In an exemplary case, compiled records can be reflected by the UI 1002 as shown at 1016. In this way, a legacy profile subject is afforded the opportunity to contextualize her legacy profile according to her own selection of public records automatically obtained by personal legacy accountant 164.

Figure 11:
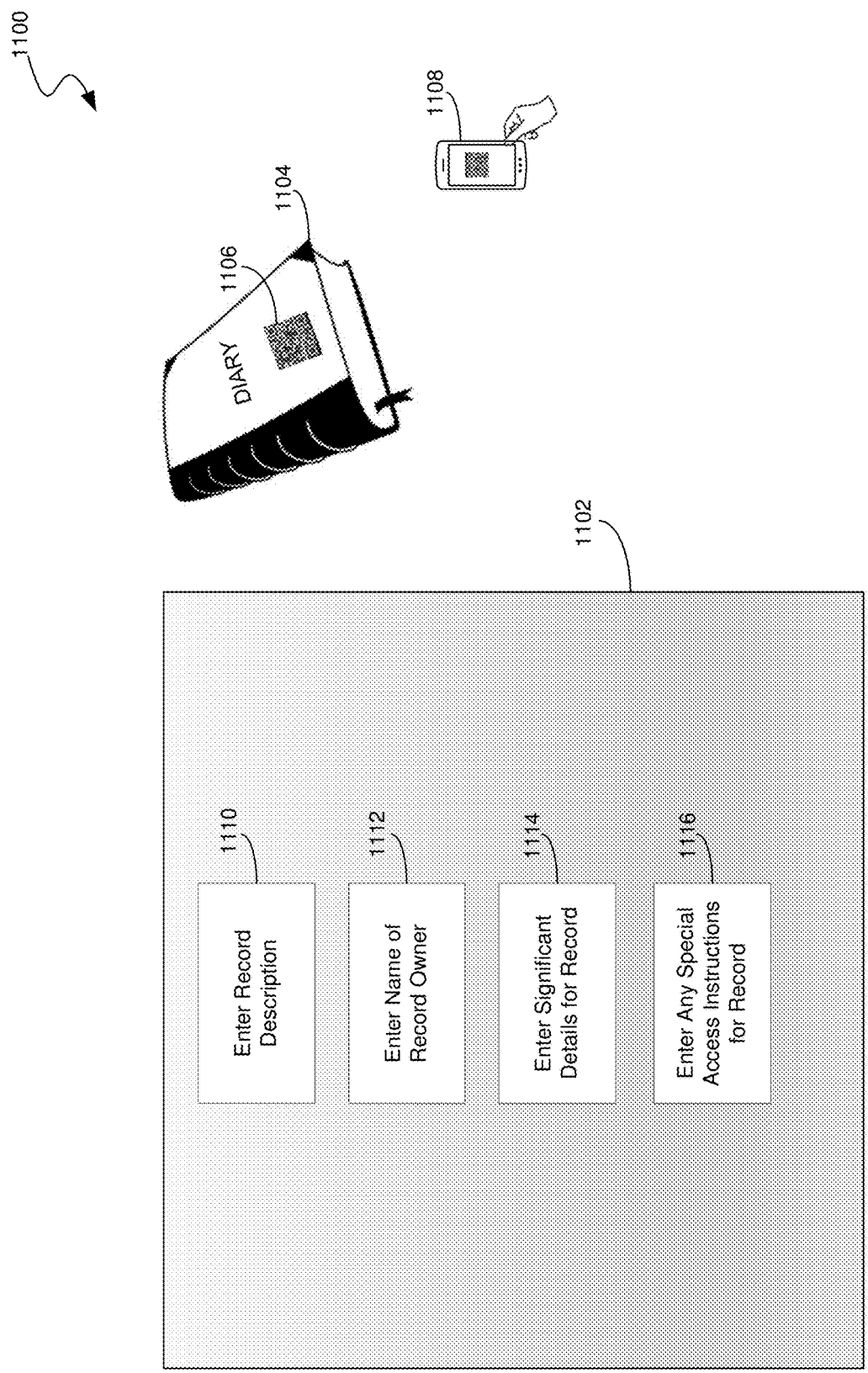
FIG. 11 is a conceptual diagram illustrating, according to some implementations of the present technology, a UI according to a personal legacy accountant.

FIG. 11 is a conceptual diagram 1100 illustrating, according to some implementations of the present technology, a UI 1102 according to a personal legacy accountant 164 executing the process of FIG. 6A. For example, the UI 1102 can, for a personal record associated to a real-world object, provide a legacy profile subject various options for detailing certain contextual data to be associated with that object. In this exemplary case, such a real-world object can consist of the subject's diary 1104 to which a QR code 1106 is affixed for interpretation by smartphone 1108. In response to that interpretation, profile generation module 346 of personal legacy accountant 164 can present to the legacy profile subject certain input fields that can define contextual data to be associated with the diary 1104. Examples of such data include the shown input fields 1110, 1112, 1114, and 1116. For instance, field 1110 may be completed to describe a "Diary" belonging to the legacy profile subject as record owner in field 1112. Field 1114 provides the legacy profile subject an opportunity to enter any significant details for diary 1104, e.g., "Read entry 1342 first." Field 1116 provides the subject an ability to restrict access to the legacy profile records for the diary 1104, where an access criterion may be, "Access is only permitted for my daughter after she has indicated graduation from college." Configuration of the personal legacy accountant 164 in this way enables a legacy profile subject to contextualize personal records content(s) such that, for supplied records, a legacy profile subject can impart, for example, an importance for records, records portions, and access criteria for accessing those records.

Figure 12B:
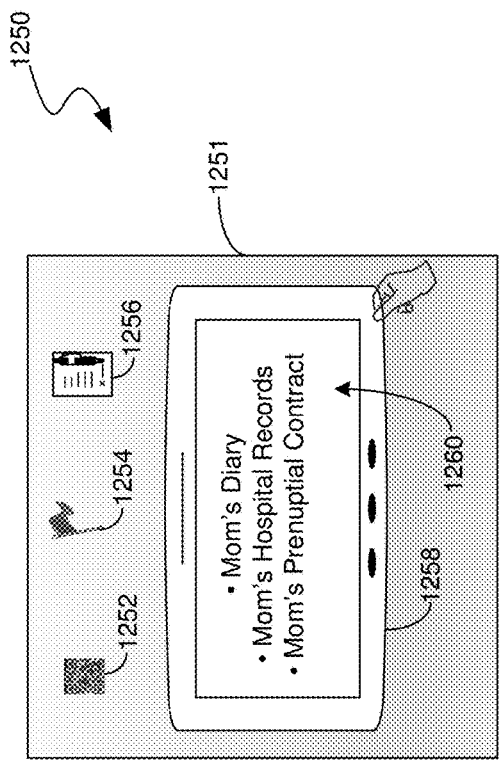
FIG. 12B is a conceptual diagram illustrating, according to some implementations of the present technology, a UI demonstrating access to a legacy profile of an individual for designations corresponding to one or more personal records included in the legacy profile.
Figure 12C:
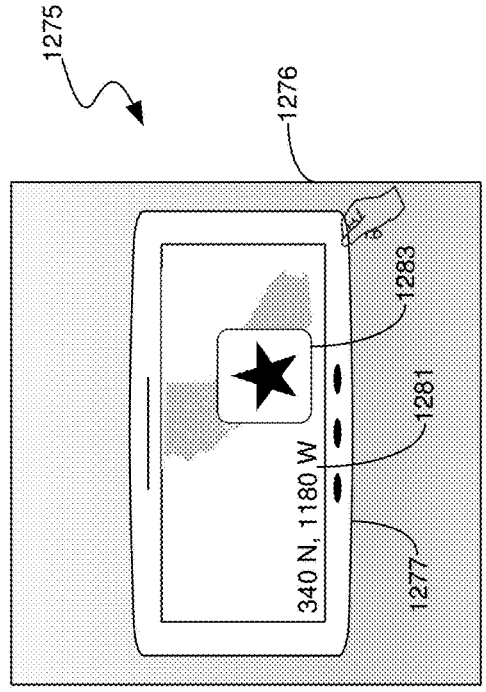
FIG. 12C is a conceptual diagram illustrating, according to some implementations of the present technology, a UI demonstrating accessing a personal legacy profile of an individual according to a geolocation of a user of a personal legacy accountant herein.
Figure 12A:
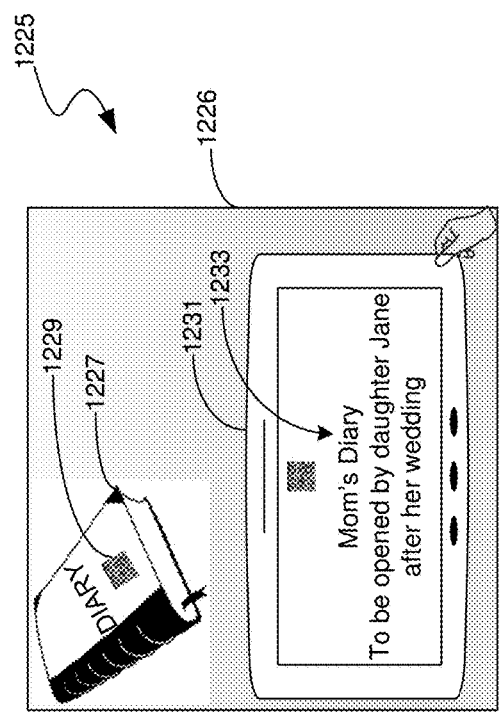
FIG. 12A is a conceptual diagram illustrating, according to some implementations of the present technology, a UI demonstrating contextual data accessed for a personal record included in a legacy profile of an individual.

FIG. 12A is a conceptual diagram 1225 illustrating, according to some implementations of the present technology, a UI 1226 demonstrating contextual data accessed for a personal record included in a legacy profile of an individual. For example and with respect to a real-world object such as a diary 1227 having a QR code 1229 affixed thereto, a personal electronic device 1231 can convey, for personal record 1233, that the real-world object associated to the personal record by QR code 1229 is "Mom's Diary." In addition and via the association for the personal record, contextual information of, "To be opened by daughter Jane after her wedding," can be conveyed. In other words, access for a legacy profile can convey its contents for personal records including the object of that record and any contextual information supplied by a legacy profile subject.

FIG. 12B is a conceptual diagram 1250 illustrating, according to some implementations of the present technology, a UI 1251 demonstrating access to a legacy profile of an individual for designations corresponding to one or more personal records included in the legacy profile. As shown by this exemplary case, designations defining associations for personal records are conveyed by a QR code 1252, a tag 1254, and an image profile 1256. That is, upon personal legacy accountant 164 (as may be implemented by a personal electronic device 1258) receiving an indication for a real-world object corresponding to a respective one of the associations, a relevant personal record can be conveyed to a user of personal legacy accountant 164. Here, corresponding personal records for QR Code 1252, tag 1254, and image profile 1256 include "Mom's Diary," "Mom's Hospital Records," and "Mom's Prenuptial Contract."

FIG. 12C is a conceptual diagram 1275 illustrating, according to some implementations of the present technology, a UI 1276 demonstrating accessing a personal legacy profile of an individual according to a geolocation of a user of a personal legacy accountant herein. In particular, access to that profile can be triggered upon a user of personal legacy accountant 164 being located at a geolocation prescribed by a legacy profile subject, where, for instance, such geolocation can be detected by a navigation system included in a personal electronic device 1277 belonging to the user. In this regard, such a system can detect and convey a geolocation (e.g., GPS coordinates) 1281 according to a positioning of the device while in the custody of the user. Similarly as in the case of FIGS. 12A and 12B, personal electronic device 1277 could, according to the positioning, trigger an opportunity for access to a personal record for the geolocation, and then convey that record once access criteria are satisfied.

Figure 13:
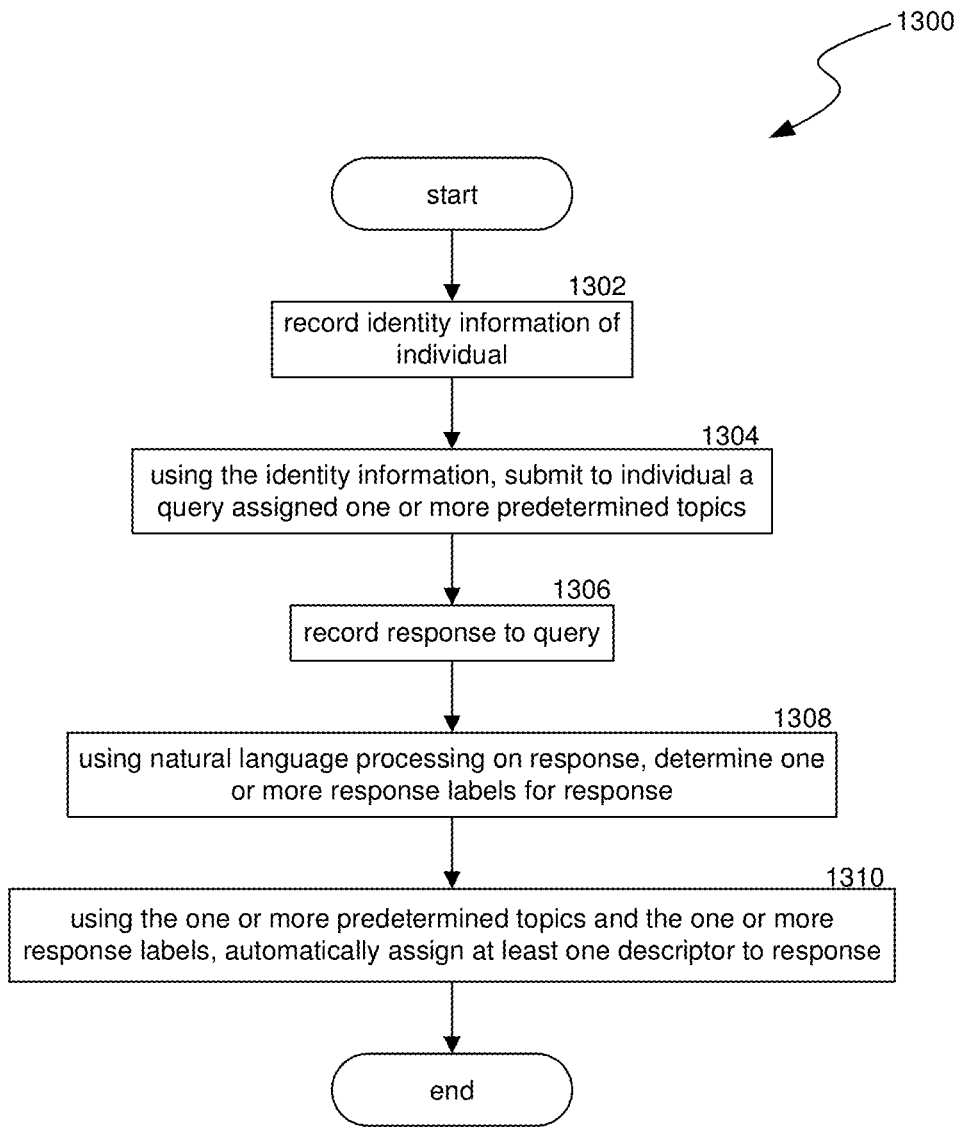
FIG. 13 is a flow diagram illustrating a process used in some implementations for automatically assigning one or more descriptors to a query/response pair for an individual who is the subject of a legacy profile.

FIG. 13 is a flow diagram illustrating a process 1300 used in some implementations for automatically assigning one or more descriptors to a query/response pair for an individual who is the subject of a legacy profile. Process 1300 can be initiated as an effort to obtain, for the legacy profile subject, one or more query/response pairs that can recount one or more life experiences for that subject. In some implementations, the query/response pairs can be a personal record for a legacy profile, as discussed above. One or more portions of process 1300 can be performed according to an application that can be executed on a smart device that can process a query/response pair to determine and automatically assign the one or more descriptors; and in some cases, one or more portions of process 1300 can be executed by a server in communication with the smart device—e.g., for providing a mapping of descriptors that can be applicable for query/response pairs.

At block 1302, process 1300 can record identity information of the legacy profile subject. For example, such identity information can include items such as the subject's username/password, user ID, voice profile, name, date and place of birth, or any other type of information that can be used to associate the subject to a recording for the subject's legacy profile.

At block 1304, process 1300 can, for the identity information recorded at block 1302, submit to the legacy profile subject a query assigned one or more predetermined topics. In this regard, the topics may be predetermined according to a context for the recorded identity information. For instance, a resultant query may be, "What heritage is associated with your family name?" or "What did you like most about where you grew up?" Alternatively or in addition, one or more queries can be randomly selected from a repository of queries, where particular ones of queries can be unrelated to the recorded identity information. For example, a query may inquire of the legacy profile subject, "What was your favorite childhood memory?" or "What book was the best that you had ever read?" In some instances, process 1300 can submit to the legacy profile subject a singular query or multiple queries in the same sequence. In other instances, process 1300 can submit to the legacy profile subject a predetermined number of queries (i.e., one or more) according to a defined schedule (i.e., over predefined time intervals, such as one query per day, week, or month).

At block 1306, process 1300 can record one or more responses for submitted queries, where queries and respective responses are paired. In various implementations, responses can be provided through a voice response or in a written response.

At block 1308, process 1300 can, using natural language processing on a given response for a query, determine one or more response labels. Here, the processing can be either rules-based or implemented according to machine learning. Thus, a response label can include a hierarchical characterization for a segmented portion of a query response. For example, a response of, "Playing sports with my brother," for the query, "What was your favorite childhood memory?", can yield respective response labels of "activity" and "sibling" relative to "sports" and "brother." As such, responses for queries can be pegged to certain response labels that can denote definitional characterizations of response segments. In various implementations, machine learning modes such as parts of speech tagging models, semantic tagging models, etc. can be applied to generate these response labels.

At block 1310, process 1300 can, using the one or more predetermined topics and the one or more response labels for a query/response pair, automatically assign at least one descriptor to the corresponding response. In this regard, the at least one descriptor can mean a topical identity for a response, where a topical description for a query is meshed with a response label for a response (i.e., a combination of a topic and a response label) to render the response meaningful for the query. As an example and with regard to the query/response pair, "What was your favorite childhood memory?—Playing sports with my brother," where the topic is childhood and the response label is sibling, the at least one descriptors can be, "childhood, sibling," or "childhood, activity." As another example and for the query/response pair, "What book was the best that you had ever read?—Macbeth," where the topic is "book" and the response label is "drama," the at least one descriptors can be, "drama, book." In this way, the at least one descriptor encapsulates both a topic and a response label for a query/response pair and acts as a check that a response for a given query had been provided by a legacy profile subject.

Figure 14A:
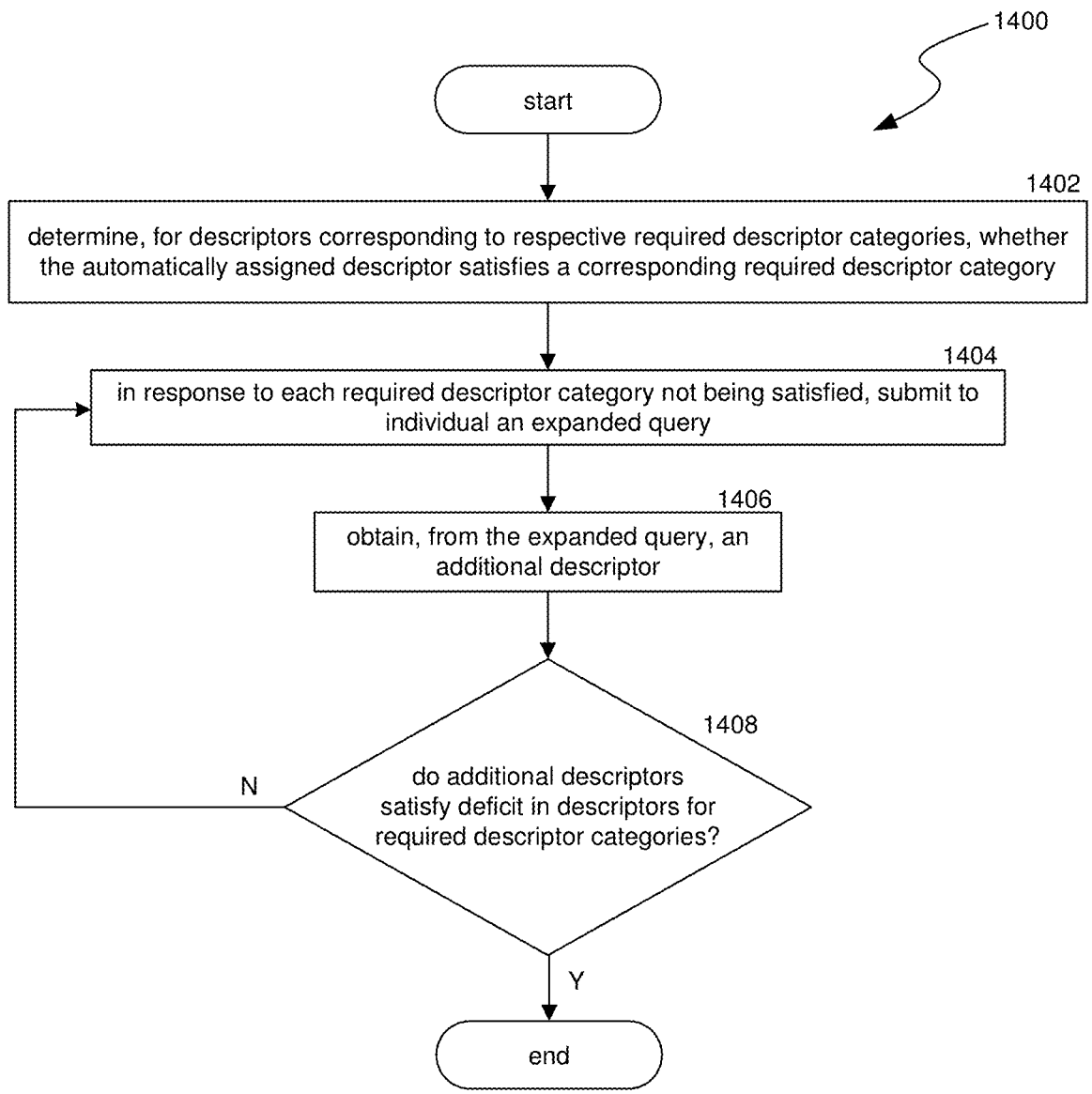
FIG. 14A is a flow diagram illustrating a process used in some implementations for identifying and rectifying a deficit in descriptors for a response to a given query.

FIG. 14A is a flow diagram illustrating a process used in some implementations for identifying and rectifying a deficit in a descriptors for a response to a given query. In some implementations, process 1400 can be initiated in response to the personal legacy accountant 164 determining that an initial query/response pair corresponding to a legacy profile subject should be expanded upon. In some implementations, one or more portions of process 1400 can be initiated by receiving, from a legacy profile subject, one or more query responses corresponding to the legacy profile subject and/or another individual. One or more portions of process 1400 can be performed according to an application that can be executed on a server for personal legacy accountant 164; while, in some cases, one or more portions of process 1400 can be performed on a client device that can be in communication one or more repositories for queries.

At block 1402, process 1400 can determine, for descriptors corresponding to respective required descriptor categories, whether the automatically assigned descriptor (i.e., at block 1310 of FIG. 13) satisfies a corresponding required descriptor category. Here, one or more required descriptor categories can be defined for each query of a query/response pair corresponding to the legacy profile subject. That is, such required categories can be specific classifications, of one or more query portions, that are intended to evoke, according to an expectation of corresponding response labels, the set of descriptors that render a response from a legacy profile subject as complete. For instance and with regard to the exemplary query, "Where did you live during your childhood?", required descriptor categories could include city and state of residence. Thus, for a response of "California," the required descriptor category of "city" would not be met since "California" would merely yield the descriptor of "state of residence." As can be understood, the required descriptor categories can be different depending on a corresponding query, and effectively provide "slots," for corresponding descriptors, that must be occupied in order to determine that a response to a query is complete.

At block 1404, process 1400 can, in response to each required descriptor category not being satisfied, submit to the legacy profile subject an expanded query corresponding to a prior query/response pair. In other words, process 1400 can formulate the expanded query such that the expanded query is directed to a required descriptor category for which a descriptor was not obtainable from a response already provided by the legacy profile subject.

At block 1406, process 1400 can obtain, for a response corresponding to the expanded query, an additional descriptor, where, as has been discussed, such a descriptor and a previously obtained descriptor would be expected to ensure completeness in response for both the initially submitted and the expanded queries.

Thus, at block 1408, process 1400 can determine whether the additionally obtained descriptor(s) satisfy, for the initially submitted and the expanded queries, the deficit in descriptors for required descriptor categories. If not, process 1400 can return to block 1404. Once the deficit is fully satisfied, process 1400 can end.

Figure 14B:
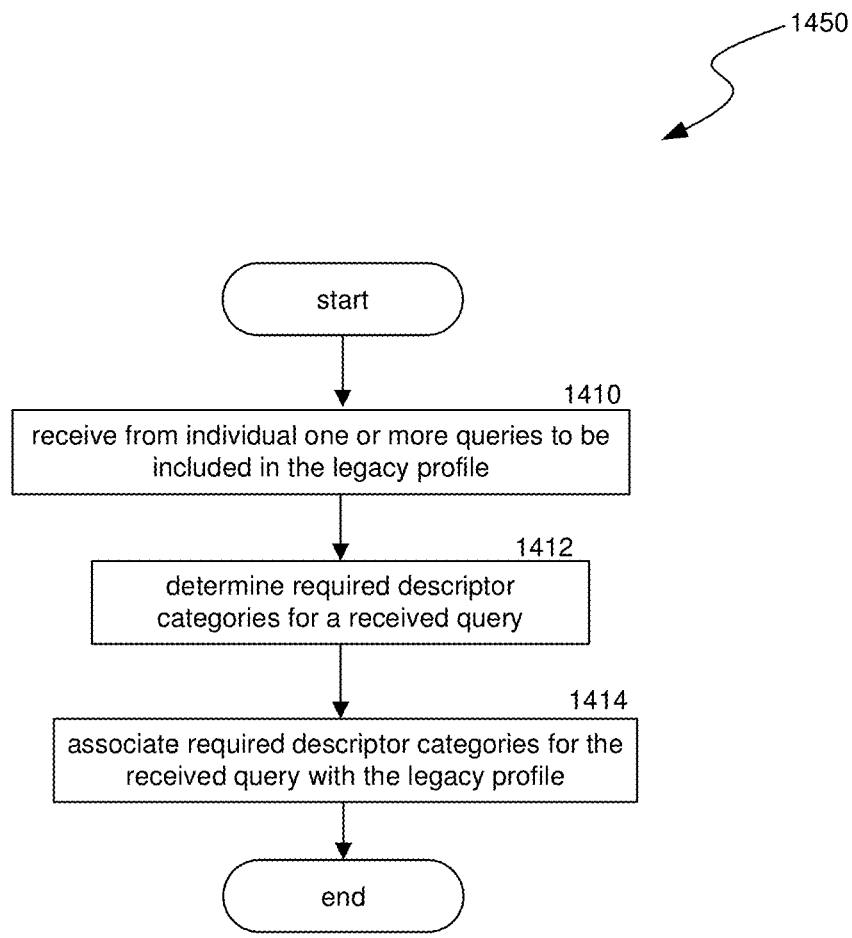
FIG. 14B is a flow diagram illustrating a process used in some implementations for formulating one or more supplemental queries where the responses and queries can inform and be included within a legacy profile of an individual.

FIG. 14B is a flow diagram illustrating a process 1450 used in some implementations for formulating one or more supplemental queries where corresponding responses and queries can be included in legacy profile records. In some implementations, one or more portions of process 1450 can be initiated by receiving, from a legacy profile subject, one or more queries corresponding to the legacy profile subject and/or another individual. One or more portions of process 1450 can be performed according to an application that can be executed on a server for personal legacy accountant 164; while, in some cases, one or more portions of process 1450 can be performed on a client device that can be in communication one or more repositories for queries.

At block 1410, process 1450 can receive from a legacy profile subject one or more queries to be included in her legacy profile. That is, process 1450 can further contextualize that profile according to a query or queries that the subject herself provides since, for example, the subject may deem the corresponding query/response pair to be significant in defining her legacy. As an example, a received query could be to ask, at a later date, "Will I remarry?" or "What happed between Aunt June and Uncle Bob?". In this way, the legacy profile subject can prescribe, according to one or more considerations being contemplated at a present time or in the future, one or more components of a personal record for her profile and/or queries that are specific to her situation. By process 1450 providing this opportunity for the subject's input, it further ensures satisfying a completeness for an intended accounting of the subject's legacy. Further, some queries provided by a first user can then be stored and used for other users, if the providing user indicates the query is not provide and/or not specific to her situation.

At block 1412, process 1450 can determine required descriptor categories for a query received at block 1410. This way, as has been discussed above, process 1450 can similarly assess responses for subject provided queries to determine completeness for those responses. In some cases, the user providing the query can supply the required descriptor categories for that query. As a result, process 1450 would then be enabled to formulate one or more expanded queries for subject provided queries whenever a deficit in descriptors for subject query/response pairs exists.

At block 1414, process 1450 can associate the required descriptor categories for subject provided queries with the legacy profile for the subject. As such, process 1450 can, for a respective descriptor category, queue a corresponding subject-provided query.

Figure 15:
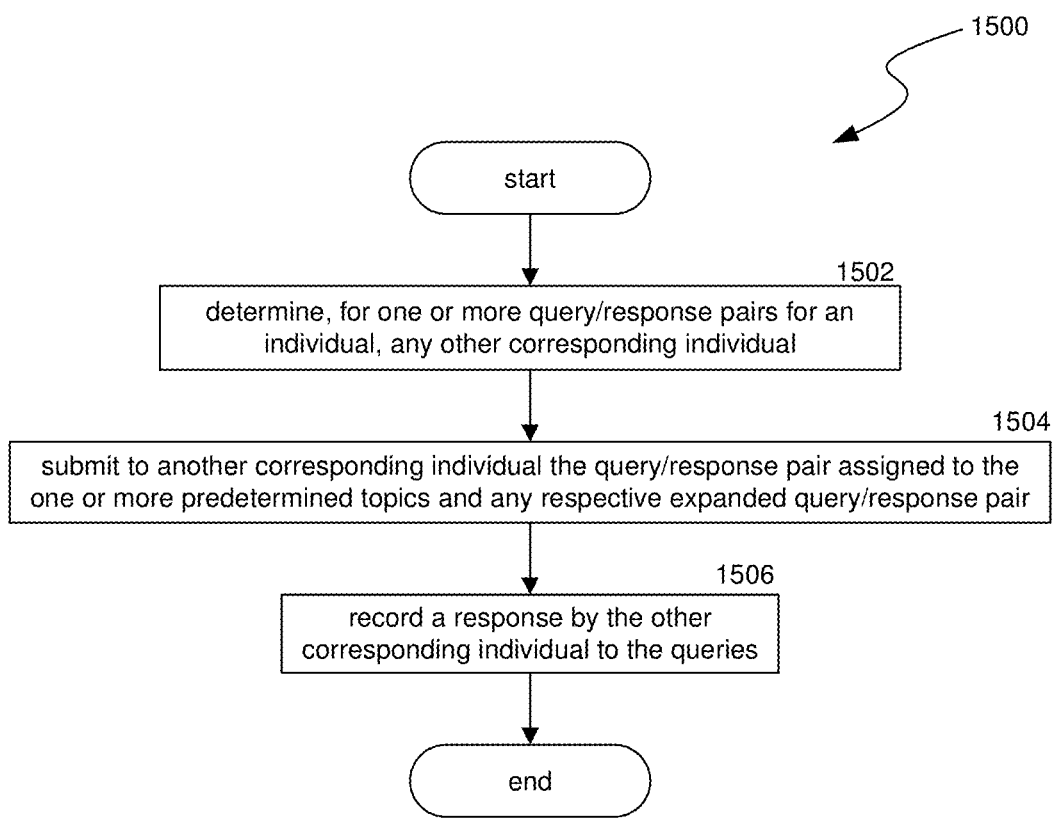
FIG. 15 is a flow diagram illustrating a process used in some implementations for obtaining, from an additional individual, input for a query/response submitted to an individual who is the subject of a legacy profile.

FIG. 15 is a flow diagram illustrating a process 1500 used in some implementations for obtaining, from any additional individual, corresponding input for a query/response submitted to an individual who is the subject of a legacy profile. In some implementations, process 1500 can be initiated in response to such an additional individual being identified in a query/response pair of a legacy profile subject. In other implementations, process 1500 can be initiated as a result of, for example, a relative or other individual associated with the legacy profile subject sharing a same experience as expressed for a query/response pair corresponding to the legacy profile subject. One or more portions of process 1500 can be performed according to an application that can be executed on a server for personal legacy accountant 164; alternatively, one or more portions of process 1500 can be performed on a client device executing the application.

At block 1502, process 1500 can determine, for one or more query/response pairs for a legacy profile subject, any other corresponding individual. As an example, such other corresponding individual can be one who had been the subject of a query submitted to the legacy profile subject and/or a provided response. As another example, such other corresponding individual can be one who shares a commonality of experience for a query/response pair pertaining to the legacy profile subject. In this case, for instance, that commonality of experience may be exemplified by proximity in age with the legacy profile subject, similarity of experience, similarity of location, relation according to a family tree with which the subject's legacy profile can be associated, etc.

At block 1504, process 1500 can, for queries and responses of a legacy profile subject, submit to the other corresponding those same queries and responses. In an exemplary case, the submission can occur via a live interview for the corresponding individual. In another exemplary case, the submission can occur via an audio file which the corresponding individual can receive, for instance, via text or email.

At block 1506, process 1500 can record a response of the corresponding individual for one or more of the queries and responses of the legacy profile subject. By doing so, process 1500 can further contextualize the legacy profile of the subject whereby contributions of the corresponding individual can elaborate on one or more facts, recollections, or opinions of the legacy profile subject.

Figure 16:
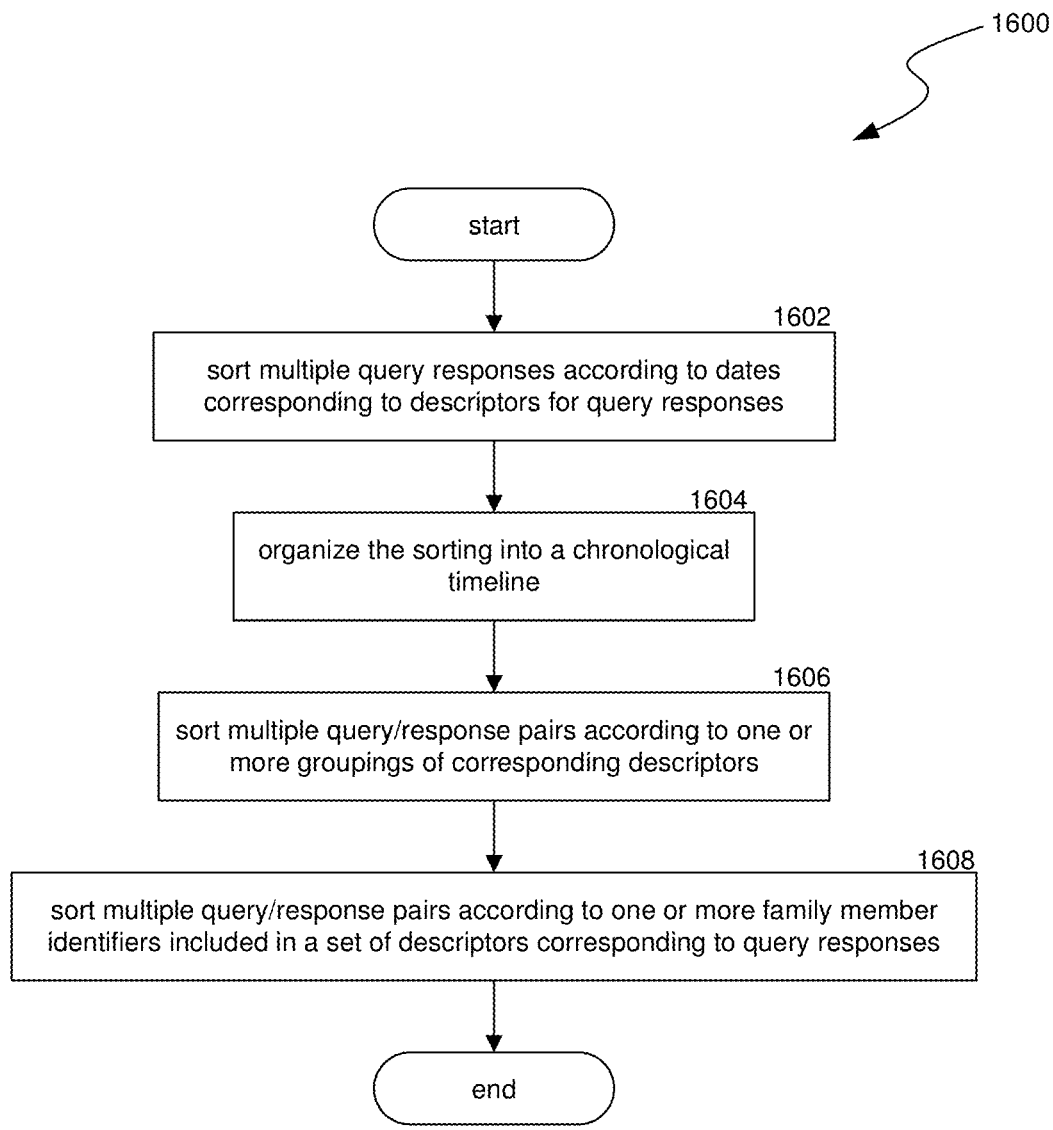
FIG. 16 is a flow diagram illustrating a process used in some implementations for categorizing queries/responses forming a legacy profile of an individual.

FIG. 16 is a flow diagram illustrating a process 1600 used in some implementations for categorizing queries/responses forming a legacy profile of an individual. Process 1600 can be initiated in response to one or more query/response pairs for a legacy profile subject being completed. One or more portions of process 1600 can be performed according to an application that can be executed on a smart device for identifying query/response pairs; and in some cases, one or more portions of process 1600 can be executed by a server in communication with the smart device—e.g., for providing a mapping of responses for queries.

At block 1602, process 1600 can sort multiple query responses according to dates corresponding to descriptors for query responses. For instance, where a descriptor defines a particular date for query response, process 1600 can acknowledge that date for sorting among other dates pertaining to a corresponding expanded query/response pair.

At block 1604, process 1600 can organize the sorting achieved at block 1602 into a chronological timeline. That is, process 1600 can ferret through dates for query/response pairs (i.e., dates in a set of defined descriptors for the pairs) and arrange them in a timewise fashion to reflect a progression of events, for example.

At block 1606, process 1600 can sort the multiple query/response pairs according to one or more groupings of corresponding descriptors. This way, the sorting can achieve, for example, an index for responses matching queries that can be searchable for a query input by a user of personal legacy accountant 164. That is, the sorting can result in a subset of multiple recorded responses having defined descriptors that match a query submitted by a user of personal legacy accountant 164.

At block 1608, process 1600 can sort multiple query/response pairs according to one or more family member identifiers included in a set of descriptors corresponding to query/response pairs for a legacy profile subject. For instance, if one or more descriptors pertaining to a query or expanded query response of an individual identify a family member, the process 1600 can categorize those responses as pertaining to the identified family member. In this way, queries and corresponding responses can be linked to such a member in, for example, a family tree organization of family members.

Figure 17:
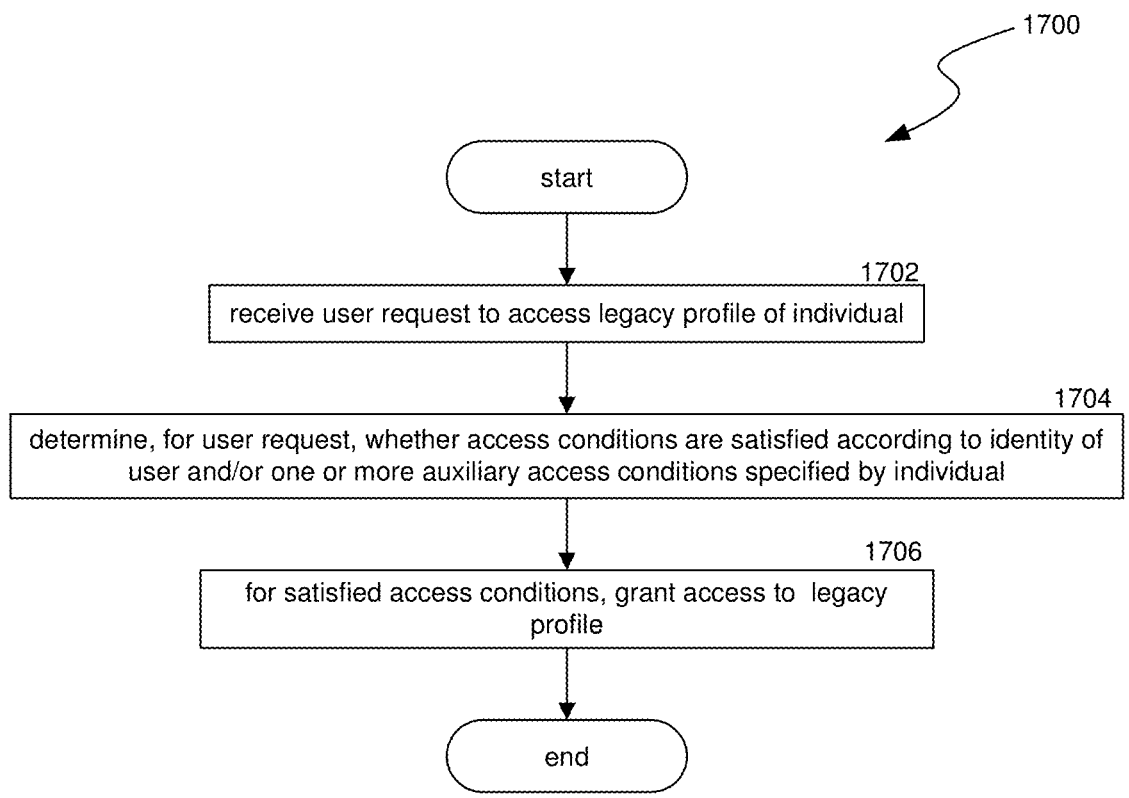
FIG. 17 is a flow diagram illustrating a process used in some implementations for granting access to a legacy profile of an individual.

FIG. 17 is a flow diagram illustrating a process 1700 used in some implementations for granting access to a legacy profile of an individual. Process 1700 can be initiated when a user of personal legacy accountant 164 desires to access a legacy profile of an individual. In some implementations, process 1700 can be initiated when that user queries an identity of a legacy profile subject and/or one or more topics relating to that identity. One or more portions of process 1700 can be performed according to an application that can be executed on a server for personal legacy accountant 164; alternatively, one or more portions of process 700 can be performed on a client device executing the application.

At block 1702, process can receive a user request to access the legacy profile of an individual. For instance, the request can be received as a result of the user entering certain bibliographical information (e.g., user name, date of birth), scanning a QR code or other link or identifier associated with a particular legacy profile, opening a legacy profile application in a context associated with a particular legacy profile such as a location or event, etc.

At block 1704, process 1700 can determine whether access conditions, specified by a legacy profile subject, are satisfied. In some implementations, the access conditions can specify that only a particular user, or particular users, can be accorded access. In other implementations, the access conditions can specify that, for a particular user, certain auxiliary restraints to access are applicable. For instance, it may be the case that a legacy profile subject has specified that a user, who is her daughter, must have been married by the time access is granted for the subject's legacy profile or portion so the legacy profile.

At block 1706, process 1700 can grant access to the legacy profile (or portions thereof) for the subject in response to access conditions specified by the subject being satisfied.

Figure 18:
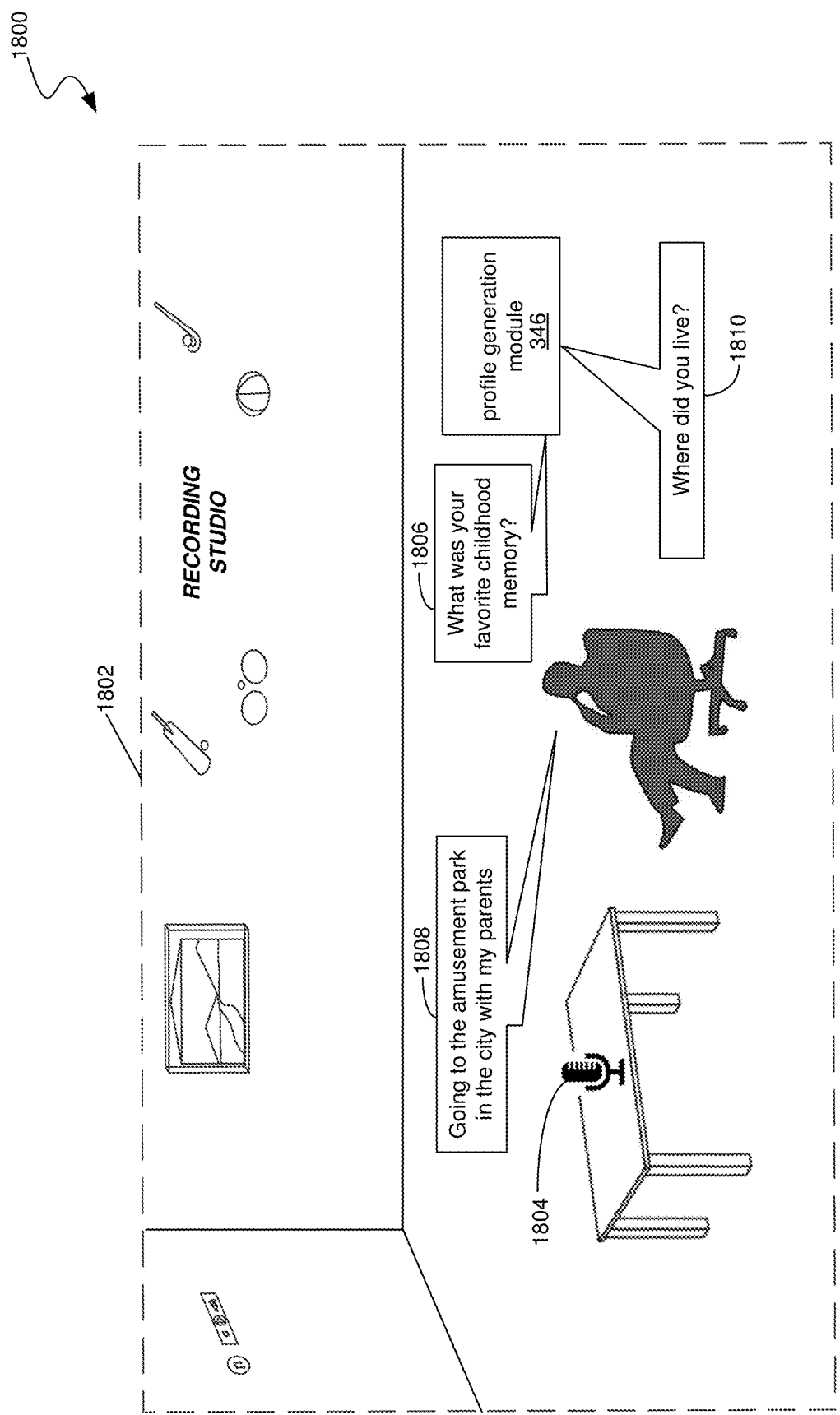
FIG. 18 is a conceptual diagram illustrating compiling, for a query/response pair corresponding to a subject of a legacy profile, an expanded query.

FIG. 18 is a conceptual diagram 1800 illustrating, according to some implementations of the present technology, compiling, for a query/response pair corresponding to a subject of a legacy profile, an expanded query. As shown for a recording studio 1802, personal legacy accountant 164 can be implemented in association with a recording device 1804. The recording device 1804 can, for queries submitted to a legacy profile subject by profile generation module 346, record applicable responses such that those responses are then incorporated into the subject's legacy profile. Here, an exemplary query 1806 can be, "What was your favorite childhood memory?" Following a response 1808 by the legacy profile subject of, "Going to the amusement park in the city with my parents," profile generation module 346 can further generate an expanded query 1810 of, "Where did you live?" In this regard, as has been explained above in relation to FIG. 14A, the expanded query can be a result of required descriptor categories for query 1806 not being satisfied. That is, it can be the case that profile generation module 346 assigned a descriptor category of "location" to query 1806. Thus, as can be understood from discussion hereinabove, profile generation module 346 can, in real-time, submit one or more expanded queries such that information intended to be obtained by an initially submitted query is acquired. In this way, profile generation module can ensure a completeness for contextualization of a legacy profile of a subject.

Figure 19:
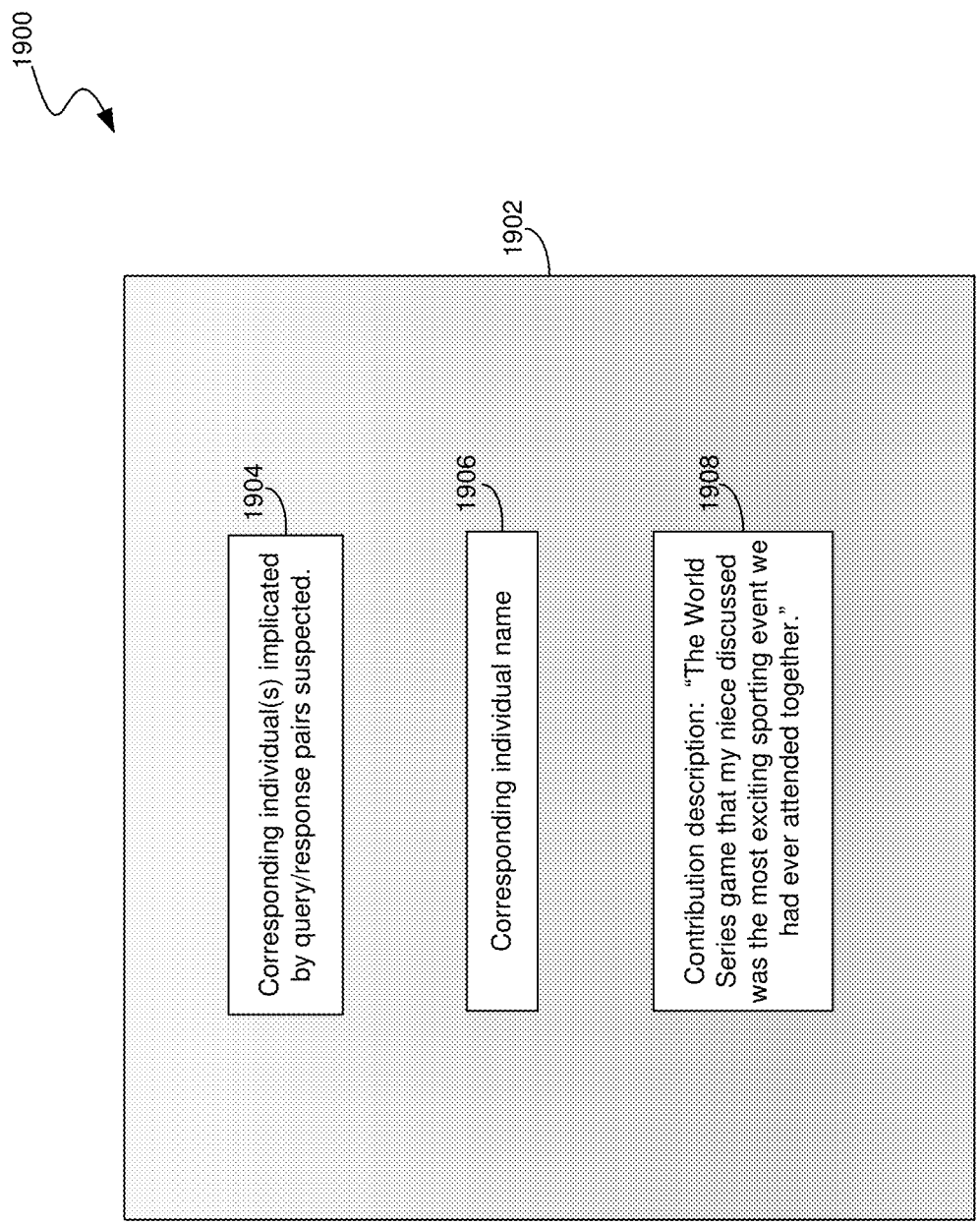
FIG. 19 is a conceptual diagram illustrating, according to some implementations of the present technology, a UI according to a personal legacy accountant.

FIG. 19 is a conceptual diagram 1900 illustrating, according to some implementations of the present technology, a UI 1902 according to a personal legacy accountant 164 executing the process of FIG. 15. In this regard, process 1500 can present, for queries and responses corresponding to a legacy profile subject, an indication 1904 as to whether any individual is implicated by those queries and/or responses. Through analysis implemented according to, for example, block 1512 of FIG. 15, process 1900 can identify a corresponding individual 1906 for a query/response pair pertaining to the legacy profile subject. As shown for the context of an exemplary query/response pair concerning a sporting event attended by an uncle to the legacy profile subject, process 1900 can indicate its determination, using descriptors for at least one query/response pair, that the uncle of the legacy profile subject can make a contribution for the legacy profile. At 1908, process 1900 can indicate a specificity for the contribution, where in the exemplary case, such a contribution provides, "The World Series game that my niece discussed was the most exciting sporting event we had ever attended." In this way, personal legacy accountant 164 can evaluate queries and corresponding responses to track one or more individuals that may have contributions to be provided and that can supplement contextualization for the legacy profile of the subject.

FIG. 20A is a conceptual diagram 2025 illustrating, according to some implementations of the present technology, a UI 2027 demonstrating accessing a legacy profile of an individual according to a timeline view 2029 for the profile. Here, the timeline view 2029 can present events 2031 for a legacy profile of an individual according to a chronological listing for those events. In the particular case shown, the events 2031 relate those of a mother for her sole child, Sally.

FIG. 20B is a conceptual diagram 2050 illustrating, according to some implementations of the present technology, a UI 1252 demonstrating accessing a legacy profile of an individual according to a query/response view 2054 for the profile. In this case, a user of personal legacy accountant 164 can, once having satisfied access conditions for the profile, enter a query 2056 to draw results 2058 for the profile that match the query 2056. In the example shown, the relevant query regards a desire of a user of personal legacy accountant 164 to know her mother's favorite recipes. Relevant results 2058 can be obtained by personal legacy accountant 164 by such accountant selecting a subset of query responses, from the individual, that include descriptors that match the user's submitted query.

FIG. 20C is a conceptual diagram 2075 illustrating, according to some implementations of the present technology, a UI 2077 demonstrating accessing a legacy profile of an individual according to a family tree view 2079 for the profile. That is, personal legacy accountant 164 can provide a user thereof an option to, where applicable, access a legacy profile of an individual where items, query/response pairs, and/or events, collectively "items" 2083, for the individual may be linked to relevant family relations 2081. In the case shown, and where Sally can be the legacy profile subject, profiles for her mother and father can be linked to her profile as a result of an association of a wedding photo of the trio.

It is to be noted that one or more of the views provided by FIGS. 20A-20C can be compiled by personal legacy accountant 164 according to identifications for one or more public and/or personal records according to FIGS. 4-12C as well as according to one or more query/response pairs compiled according to FIGS. 13-19 and that, themselves, can solely define one or more of the personal records and/or supplement data provided for one or real-objects and/or locations detailed for a personal record.

Figure 21:
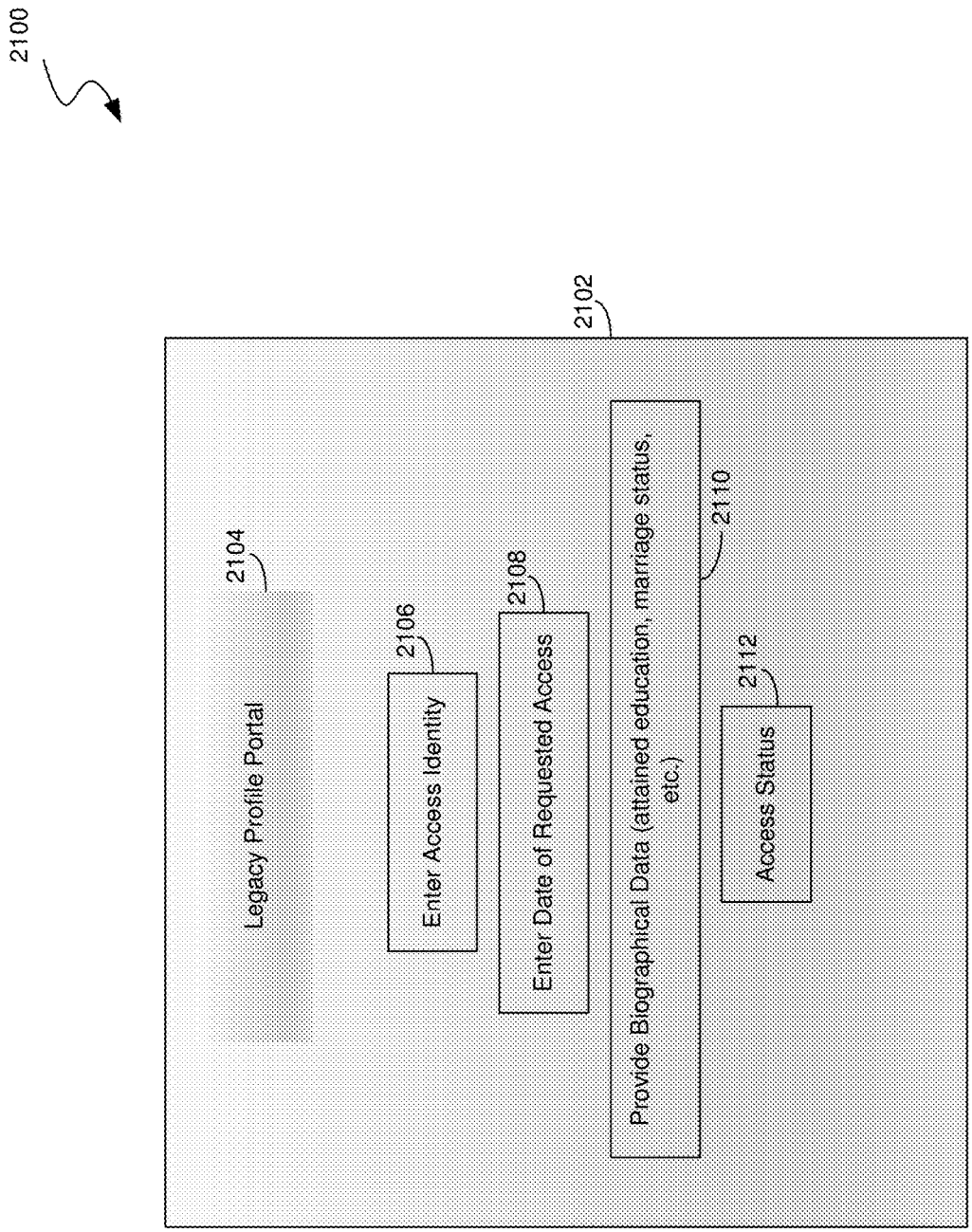
FIG. 21 is a conceptual diagram illustrating, according to some implementations of the present technology, a UI demonstrating accessing a legacy profile of an individual according to submitted user criteria received by a personal legacy accountant for the legacy profile.

FIG. 21 is a conceptual diagram 2100 illustrating, according to some implementations of the present technology, a UI 2102 demonstrating accessing a legacy profile of an individual according to user criteria received by a personal legacy accountant 164 for the legacy profile. Thereat, UI 2102 can present a Legacy Profile Portal 2104. The portal 2104 can convey various input fields 2106, 2108, and 2110 respectively corresponding to an access identity of a user of personal legacy accountant 164, a date of requested access, and various biographical data (e.g., attained education, marriage status) corresponding to the user. At 2112, UI 2102 can convey an access status that can relate whether, for the inputs described above, the user is permitted access to the legacy profile of the individual. In this way, personal legacy accountant 164 can, according to preferences provided by the individual that is the subject of the underlying legacy profile, police divulging contents for the profile.

As will be understood according to one or more contextualizations that may be desired to be provided by an individual for her personal legacy, a corresponding legacy profile can be made available in a number of ways. For example, such a profile could be appended (via a QR code, for example) to a last will and testament and/or a marker at a final resting place, or, as discussed, as a link appearing for family tree representation.

In some implementations, for example where the personal legacy accountant 164 includes or is co-operable with a scheduling component operable for the legacy profile subject, that subject can be prompted to establish or widen the contents scope of a corresponding legacy profile. For example, it is contemplated that personal legacy accountant 164 could, in regard to a risk-associated event (e.g., a military deployment, a medical procedure), invoke one or more records gathering processes (i.e., obtaining public records and/or personal records, obtaining query/response pairs) prior to the event occurring.

Figure 22:
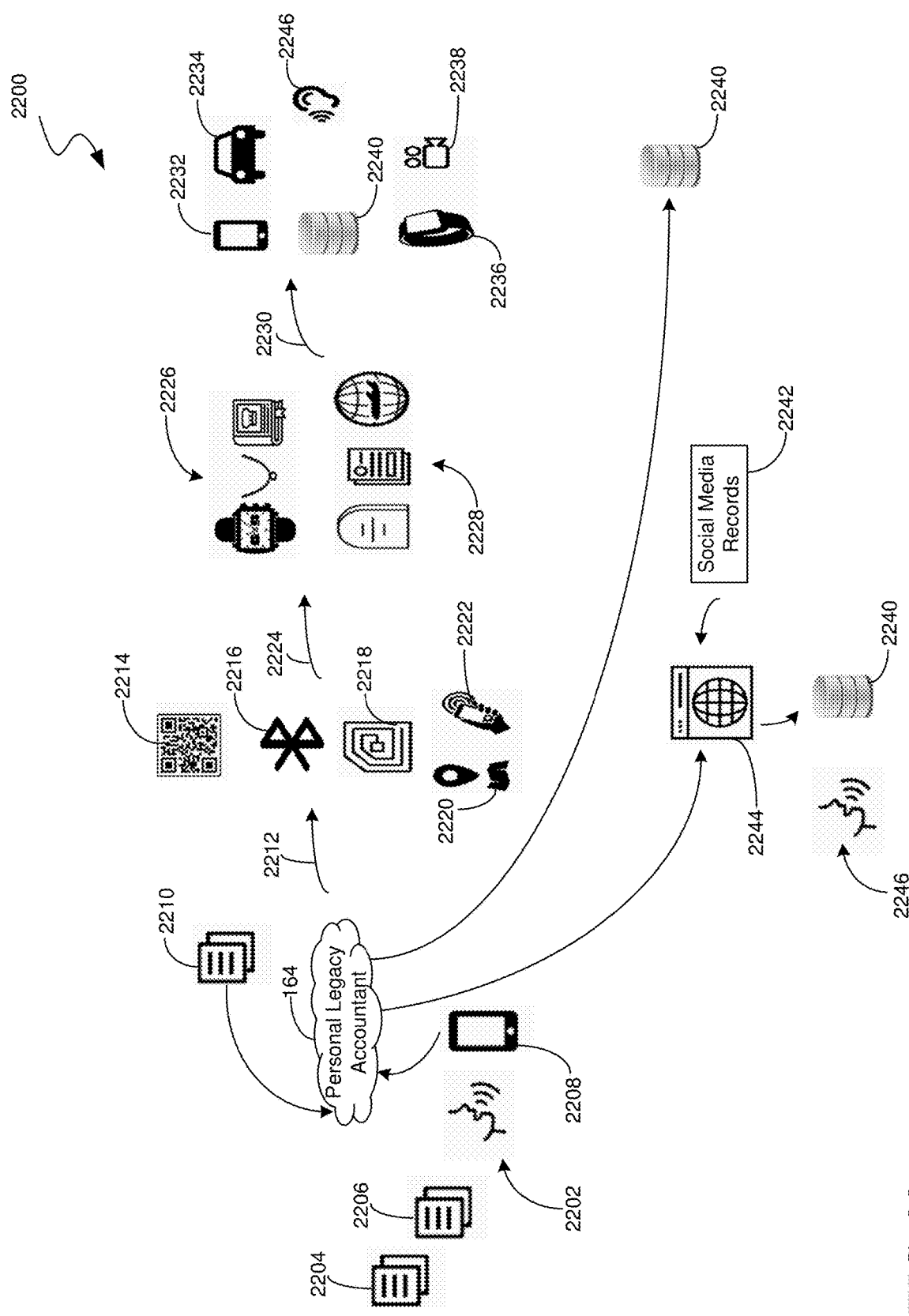
FIG. 22 is a conceptual diagram illustrating, according to some implementations of the present technology, compilation of various content for a legacy profile of an individual in connection with access to that content by a user of a personal legacy accountant for the legacy profile.

FIG. 22 is a conceptual diagram 2200 illustrating, according to some implementations of the present technology, compilation of various content for a legacy profile of an individual in connection with access to that content by a user of the personal legacy accountant 164 for the legacy profile. For instance, the personal legacy accountant 164 can, for an individual 2202 who is the subject of the legacy profile, compile certain information corresponding to query/response pairs 2204 and any relevant expanded query or queries 2206. The accountant 164 can further compile one or more public records 2210 (like those described in connection with FIG. 8) that can inform the legacy profile. Content for the profile can be further accumulated by the accountant 164 at 2212 according to one or more keys (e.g., a QR code 2214, a Bluetooth device signal 2216, a RFID device signal 2218, a geolocation 2220 and/or near field communication signal 2222) associated, at 2224, with one or more real-world objects 2226 (e.g., jewelry such as a watch or necklace, a diary) and/or personal records 2228 identified for the legacy profile subject. For instance, such personal records can be embodied by an epitaph for the legacy profile subject, her will or a travel experience detectable through geolocation as described herein.

The personal legacy accountant 164 can coordinate a user's access for the profile, at 2230, through interpretation of the profile according to, for example, the one or more above-described keys or a spoken query of a user of the accountant 164. That is, the profile may be interpretable via one or more output devices, e.g., a smartphone 2232, a vehicle 2234 equipped with one or more GPS systems, a smartwatch 2236, an imaging device 2238 operable with one or more of the described smart devices and/or a smart output device 2240 able to receive a user inquiry and output a corresponding profile response to a user 2246.

In some implementations, the personal legacy accountant 164 can, in addition to the above-described information for the legacy profile of the individual, compile one or more social media public records 2242 according to categorizations 2244 for those records. This way, the user 2246 can seek and obtain (e.g., through query/response pairs described herein) legacy information pertaining to the individual's legacy as provided by social media outlets.

Thus, as can be appreciated from the above, the personal legacy accountant 164 can facilitate informing a user of the accountant 164 with respect to one or more public and/or personal records associated with a personal legacy profile subject desiring that such legacy aspects be conveyed.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of generating a legacy profile of a subject, the method comprising:
   receiving identity information of the subject;
   automatically obtaining public records about the subject;
   receiving validation that one or more of the public records correspond to the subject;
   in response to receiving validation that a respective public record corresponds to the subject, confirming inclusion of the respective public record in the legacy profile of the subject by receiving a confirmation input from the subject;
   receiving personal records, supplied by the subject, comprising one or more of a writing, a visual, a sound recording, or any combination thereof, wherein at least one or more first personal records of the personal records are correlated, by the subject, with a geographic location; and
   receiving an indication of a real-world object that is associated with the first personal records via a key, wherein the key comprises one or more of:
      an image profile for the real-world object specifying parameters for a computer vision system to recognize the real-world object;
      a code, configured for recognition by a computer system, that is affixed to the real-world object;
      an electronic device, configured for recognition by the computer system, that is affixed to the real-world object; or
      any combination thereof;
   wherein:
      the first personal records comprise contextual data for the real-world object, provided by the subject,
      an access criteria secures access to the first personal records, the access criteria comprising the key and the geographic location,
      one or more access users are permitted access to selective portions of the generated legacy profile of the subject, and
      in response to a request, associated with one of the access users, permission to access the first personal records is granted based on one or more computing systems: recognizing the key, and detecting that the one access user is located at or proximate to the geographic location.

2. The method of claim 1, wherein the confirming inclusion in the legacy profile of a respective public record corresponding to the subject comprises submitting the respective public record to the subject for a determination of approval by the subject.

3. The method of claim 1, wherein the first personal records comprise one or more of a recorded audio message, a virtual reality representation of the real-world object, a 3D recording of the individual, or any combination thereof.

4. The method of claim 1, wherein access to the first personal records by the one access user is based on the one access user satisfying one or more additional access criteria specified by the subject.

5. The method of claim 1, wherein the legacy profile is associated with a family tree for the subject and wherein, in response to access of the first personal records by the one access user, the first personal records are provided in relation to a visual representation of the family tree.

6. The method of claim 1, wherein, in response to access of the first personal records by the one access user, portions of the legacy profile are provided in a playback mode, the playback mode providing audio components of the one or more personal records.

7. The method of claim 1, wherein the one or more records are validated as corresponding to the subject using one or more machine learning models, the one or more machine learning models performing the validation based on facial recognition, handwriting recognition, voice recognition, or any combination thereof.

8. The method of claim 1,
wherein the first personal records comprise a query and response personal record that includes predefined responses, from the subject, to user queries.

9. The method of claim 7,
wherein the query and response personal record comprises predefined response, from the subject, to queries pertaining to the real-world object.

10. A non-transitory computer-readable storage medium storing instructions that, when executed by a computing system, cause the computing system to perform a process for generating a personal legacy profile of a subject, the process comprising:
receiving identity information of the subject;
automatically obtaining one or more public records;
receiving validation that one or more of the public records correspond to the subject; and
in response to receiving validation that a respective public record corresponds to the subject, confirming inclusion of the respective public record in the legacy profile of the subject;
receiving personal records, supplied by the individual, comprising one or more of a writing, a visual, a sound recording, or any combination thereof, wherein at least one or more first personal records of the personal records are correlated, by the subject, with a geographic location; and
receiving an indication of a real-world object that is associated with the first personal records via a key, wherein the key comprises one or more of:
an image profile for the real-world object specifying parameters for a computer vision system to recognize the real-world object;
a code, configured for recognition by a computer system, that is affixed to the real-world object;
an electronic device, configured for recognition by the computer system, that is affixed to the real-world object; or
any combination thereof;
wherein:
the first personal records comprise contextual data for the real-world object, provided by the subject,
an access criteria secures access to the first personal records, the access criteria comprising the key and the geographic location,
one or more access users are permitted access to selective portions of the generated legacy profile of the subject, and
in response to a request, associated with one of the access users, permission to access the first personal records is granted based on one or more computing systems: recognizing the key, and detecting that the one access user is located at or proximate to the geographic location.

11. The computer-readable storage medium of claim 10, wherein the confirming inclusion in the legacy profile of a respective public record corresponding to the subject comprises submitting the respective public record to the subject for a determination of approval by the subject.

12. The computer-readable storage medium of claim 10, wherein the first personal records comprise one or more of a recorded audio message, a virtual reality representation of the real-world object, a 3D recording of the individual, or any combination thereof.

13. The computer-readable storage medium of claim 10, wherein access to the first personal records by the one access user is based on the one access user satisfying one or more additional access criteria specified by the subject.

14. The computer-readable storage medium of claim 10, wherein the legacy profile is associated with a family tree for the subject and wherein, in response to access of the first personal records by the one access user, the first personal records are provided in relation to a visual representation of the family tree.

15. The computer-readable storage medium of claim 10, wherein, in response to access of the first personal records by the one access user, portions of the legacy profile are provided in a playback mode, the playback mode providing audio components of the one or more personal records.

16. A computing system for generating a personal legacy profile of an individual, the computing system comprising:
one or more processors; and
one or more memories storing instructions that, when executed by the one or more processors, cause the computing system to perform a process comprising:
receiving identity information of a subject;
automatically obtaining one or more public records;
receiving validation that one or more of the public records correspond to the subject;
in response to receiving validation that a respective public record corresponds to the subject, confirming inclusion of the respective public record in the legacy profile of the subject;
receiving personal records, supplied by the individual, comprising one or more of a writing, a visual, a sound recording, or any combination thereof, wherein at least one or more first personal records of the personal records are correlated, by the subject, with a geographic location; and
receiving an indication of a real-world object that is associated with the first personal records via a key, wherein the key comprises one or more of:
an image profile for the real-world object specifying parameters for a computer vision system to recognize the real-world object;
a code, configured for recognition by a computer system, that is affixed to the real-world object;
an electronic device, configured for recognition by the computer system, that is affixed to the real-world object; or
any combination thereof;
wherein:
the first personal records comprise contextual data for the real-world object, provided by the subject,
an access criteria secures access to the first personal records, the access criteria comprising the key and the geographic location,
one or more access users are permitted access to selective portions of the generated legacy profile of the subject, and
in response to a request, associated with one of the access users, permission to access the first personal records is granted based on one or more computing systems: recognizing the key, and detecting that the one access user is located at or proximate to the geographic location.

17. The computing system of claim 16,
wherein the first personal records comprise one or more of a recorded audio message, a virtual reality representation of the real-world object, a 3D recording of the individual, or any combination thereof.

18. The computing system of claim 16,
wherein access to the first personal records by the one access user is based on the one access user satisfying one or more additional access criteria specified by the subject.

19. The computing system of claim 16,
wherein the legacy profile is associated with a family tree for the subject and wherein, in response to access of the first personal records by the one access user, the first personal records are provided in relation to a visual representation of the family tree.

20. The computing system of claim 16,
wherein, in response to access of the first personal records by the one access user, portions of the legacy profile are provided in a playback mode, the playback mode providing audio components of the one or more personal records.

* * * * *